United States Patent
Wang et al.

(10) Patent No.: US 9,611,416 B2
(45) Date of Patent: Apr. 4, 2017

(54) SALT-TOLERANT, THERMALLY-STABLE RHEOLOGY MODIFIERS

(75) Inventors: Janice Jianzhao Wang, Yorktown Heights, NY (US); Jun Zheng, Morris Plains, NJ (US); David Farrar, Walk Idle (GB); Osama M. Musa, Kinnelon, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 670 days.

(21) Appl. No.: 13/881,083

(22) PCT Filed: Oct. 25, 2011

(86) PCT No.: PCT/US2011/057718
§ 371 (c)(1),
(2), (4) Date: Jul. 9, 2013

(87) PCT Pub. No.: WO2012/061147
PCT Pub. Date: May 10, 2012

(65) Prior Publication Data
US 2013/0324443 A1    Dec. 5, 2013

Related U.S. Application Data

(60) Provisional application No. 61/406,402, filed on Oct. 25, 2010.

(51) Int. Cl.
*C09K 8/12* (2006.01)
*E21B 43/26* (2006.01)
(Continued)

(52) U.S. Cl.
CPC .............. *C09K 8/12* (2013.01); *C04B 24/163* (2013.01); *C04B 24/2641* (2013.01); *C04B 24/2652* (2013.01); *C04B 24/2688* (2013.01); *C08F 220/18* (2013.01); *C08F 220/56* (2013.01); *C08F 220/58* (2013.01); *C09K 8/24* (2013.01); *C09K 8/487* (2013.01); *C09K 8/588* (2013.01); *C09K 8/68* (2013.01); *C09K 8/882* (2013.01); *E21B 7/00* (2013.01); *E21B 33/13* (2013.01); *E21B 43/16* (2013.01); *E21B 43/26* (2013.01); *C04B 2103/0079* (2013.01)

(58) Field of Classification Search
None
See application file for complete search history.

(56) References Cited

U.S. PATENT DOCUMENTS 4,526,947 A * 7/1985 Castner .................... 526/240
4,702,844 A * 10/1987 Flesher .................... C02F 1/54
                                                    162/164.3
(Continued)

OTHER PUBLICATIONS

International Search Report, PCT/US2011/057718, Published on May 10, 2012.

*Primary Examiner* — John J Figueroa
(74) *Attorney, Agent, or Firm* — William J. Davis

(57) ABSTRACT

A salt-tolerant, thermally-stable rheology modifier and, in particular, a rheology modifier for applications in oilfield well-bore fluids. In accordance with one aspect, the rheology modifier comprises a terpolymer of acrylamide, 2-acrylamido-2-methyl-propanesulfonic acid (AMPS) and a long-chain alkyl acrylate wherein the terpolymer is prepared by dispersion polymerization.

12 Claims, 8 Drawing Sheets

| (51) | Int. Cl. | |
|---|---|---|
| | C04B 24/16 | (2006.01) |
| | C04B 24/26 | (2006.01) |
| | C09K 8/24 | (2006.01) |
| | C09K 8/487 | (2006.01) |
| | C09K 8/588 | (2006.01) |
| | C09K 8/68 | (2006.01) |
| | C09K 8/88 | (2006.01) |
| | C08F 220/18 | (2006.01) |
| | C08F 220/56 | (2006.01) |
| | C08F 220/58 | (2006.01) |
| | E21B 7/00 | (2006.01) |
| | E21B 33/13 | (2006.01) |
| | E21B 43/16 | (2006.01) |
| | C04B 103/00 | (2006.01) |

(56) References Cited

U.S. PATENT DOCUMENTS

| 4,861,499 | A | | 8/1989 | Neff et al. | |
|---|---|---|---|---|---|
| 5,399,269 | A | * | 3/1995 | Moradi-Araghi | C08K 5/0025 |
| | | | | | 166/270 |
| 5,682,951 | A | * | 11/1997 | Sydansk | 166/292 |
| 2005/0277554 | A1 | | 12/2005 | Blauch et al. | |
| 2006/0234871 | A1 | * | 10/2006 | Dalrymple | C09K 8/428 |
| | | | | | 507/211 |
| 2006/0260812 | A1 | | 11/2006 | Eoff et al. | |
| 2008/0128131 | A1 | | 6/2008 | Nguyen et al. | |
| 2009/0120642 | A1 | * | 5/2009 | Eoff | C09K 8/5083 |
| | | | | | 166/280.2 |
| 2010/0093874 | A1 | | 4/2010 | Monin et al. | |
| 2012/0024525 | A1 | * | 2/2012 | Svarczkopf et al. | 166/267 |

\* cited by examiner

SALT-TOLERANT, THERMALLY-STABLE RHEOLOGY MODIFIERS

CROSS REFERENCE TO RELATED APPLICATIONS

This application is the national stage of PCT Application No. PCT/US2011/057718 filed Oct. 25, 2011, which claims priority from Provisional Patent Application No. 61/406,402, filed Oct. 25, 2010, the entire disclosures of which are hereby incorporated in their entirety.

The present application is directed to a salt-tolerant, thermally-stable rheology modifier and, in particular, to a rheology modifier for applications in oilfield wellbore fluids. In accordance with one aspect of the invention, the rheology modifier comprises a terpolymer of acrylamide, 2-acrylamido-2-methyl-propanesulfonic acid (commonly known as AMPS®, registered trademark of The Lubrizol Corporation) and a long-chain alkyl acrylate wherein the terpolymer is prepared by dispersion polymerization.

In accordance with particularly useful embodiments, the polymer composition comprises from about 30-70 wt. % acrylamide, 70-30 wt. % AMPS, and 0.01-5 wt. % long-chain alkyl acrylate. AMPS can be in either acid or neutralized form used in the polymerization process.

BACKGROUND

Wellbore fluids are utilized in the construction, repair or treatment of wellbores such as those that are drilled through earth formations in order to access reservoirs of oil, gas or water, or to access geothermal heat.

The term "wellbore fluid" as used herein means any liquid that serves a useful function when it is placed in a well during the processes of well construction, well treatment, or the repair of a well.

The wellbore fluids of the present invention are suitable for use in a variety of wellbores including wellbores assigned to oil and/or gas production, water or gas injection wellbores, water production wellbores, and geothermal wellbores.

Wellbore fluids used during well construction include drilling fluids, lost circulation control fluids, spotting fluids such as those used to help free drill pipe that has become stuck in the well, under-reaming fluids, completion fluids such as brines used to control formation pressures, perforating pills, brine loss-control pills (a "pill" is a relatively small volume of wellbore fluid, usually less than 200 barrels, that is pumped into the desired position in a wellbore to accomplish its function), fluids used during gravel-packing operations, cement slurries, and packer fluids.

Wellbore fluids typically used as well-treatment fluids include clean-up fluids that are pumped to effect the removal of residues from the well, acidic treatment fluids, fracturing fluids, and viscous fluids pumped into a permeable formation for the purpose of diverting flow into other formations or for shutting-off the flow of produced water.

Wellbore fluids used during well repair ("workover") operations include workover fluids such as a kill fluid that is pumped into a well, the kill fluid having sufficient density to stop ("kill") the production of formation fluids. Workover operations include the milling out of old downhole hardware, and can use any of the fluids listed above as required to effect the repair or re-completion of the well.

Drilling fluids are utilized when drilling a wellbore through rock formations in order to sweep the rock cuttings created at the bit up to the surface where they are removed. To control downhole pressures, the fluid's density is usually increased by the addition of a powdered dense mineral such as barite. The fluid should therefore exhibit sufficient viscosity to provide efficient cuttings removal (hole-cleaning), and sufficient gel strength for the stable suspension of barite. Drilling Fluids should also exhibit a low filtration rate (Fluid Loss) in order to lessen the possibility of differential sticking.

Completion fluids are utilized during operations that take place in the so-called completion phase of wellbore construction, which is after drilling the wellbore and before commencement of production of fluids into the wellbore (or before injection of fluids from the wellbore into a rock formation). Frequently a completion fluid will need to be viscosified to transport or suspend dispersed solid particles, and water-soluble polymers are also used to minimise the loss of completion fluid or filtrate into the permeable formation.

Treatment fluids may be utilized intermittently during the life of a wellbore, for example, when conducting stimulation or remedial operations in a rock formation penetrated by the wellbore. For example, where the treatment fluid is a fracturing fluid, it is highly desirable that the solid proppant particles that may be added to the fracturing fluid are swept efficiently along the length of the induced fractures so that the fracture remains propped open when the pumping pressure ceases. This often requires a viscosifying agent to be added to the fluid. It is also beneficial if the polymer solution reduces the rate of leak-off of the fracturing fluid into the permeable formation so that the hydraulic pressure is most effectively transmitted to the tip of the growing fracture.

Where a fracturing or other wellbore fluid is pumped at high flow rates it can enter a turbulent flow regime causing unwanted high pressure gradients. The turbulent flow and the pressure losses can be minimized by adding relatively smaller amounts (than used for viscosification) of a friction reducer.

After tubular steel liner or casing is run into a well, cement is pumped to seal the annular gap between the steel and the formation. Polymers are often added to the cement slurry to reduce the fluid loss (filtration rate) and to minimize settlement (free water).

As more and more challenging conditions are encountered in wellbore operations, there has arisen a need for improved performance water-based wellbore fluids comprising a synthetic polymeric viscosifier that exhibits improved tolerance to high temperatures and to electrolytes.

More specifically, there is a need for high-performance rheology modifiers used in water-based drilling fluids. The enhanced performance of the drilling fluids especially the High Pressure/High Temperature (HP/HT) compatibility will allow faster and safer drilling. A rheology modifier is a critical component in water-based drilling fluids to ensure a proper rheology profile which performs specific functions such as suspending weighting agents and hole cleaning. Xanthan Gum is one of the most commonly used rheology modifiers in water-based drilling fluids. Xanthan gum was known to start losing rheological properties at above 250° F. so it is not suitable for HP/HT drilling operations. A desired rheology modifier should possess similar rheological properties (e.g., highly shear thinning) with enhanced salt tolerance and thermal stability. These enhanced properties will allow successful drilling operations under HP/HT conditions. Development of such a salt-tolerant, thermally-stable rheology modifier is critically important to the drilling industry. HP/HT compatible water-based drilling fluid will allow more environmentally friendly drilling operations in a safe and efficient manner. Without a high performance rheology modifier, such drilling operations under HP/HT conditions are extremely challenging.

SUMMARY

The present application is directed to synthetic polymers suitable for use as a high-performance rheology modifier for wellbore fluids, more particularly for water-based drilling fluid applications. The polymer disclosed herein is an effective thickener and suspension agent, with excellent salt-tolerance and thermal stability compared to conventional thickeners such as Xanthan gum used in water-based drilling fluids. Moreover, the rheology modifier disclosed herein can be delivered to the field as an aqueous dispersion or a dry powder to facilitate handling and processing. The term "Rheology Modifier" as used herein refers to the terpolymer as defined herein.

The Rheology Modifier described herein exhibits rheological and thermal stability properties that are particularly useful in high-pressure/high temperature drilling operations. The rheological profiles for materials produced in accordance with the present application were obtained across a wide shear rate spectrum including at a very low shear rate using advanced rheometers. Thermal stability studies were conducted using stainless-steel pressure aging cells in a roller oven. A static aging test was also conducted to understand the suspension power of the polymer during thermal aging. The Rheology Modifier disclosed herein exhibits a similar thickening efficiency and a rheological profile (i.e., shear thinning) as Xanthan gum. However, after thermal aging up to 350° F. and higher for 16 hours, the RM polymer-containing drilling fluids disclosed herein were shown to maintain excellent rheology and suspension power, while the Xanthan gum tends to degrade significantly at temperatures over 250-300° F. Moreover, the Rheology Modifier described herein exhibits surprising synergistic effects with other ingredients (e.g., fluid loss control additives) commonly used in water-based drilling fluids, further enhancing thermal stability.

In accordance with another aspect of the present application, the Rheology Modifier set forth herein also shows potential use in cementing applications whereas polysaccharides gums such as Welan gum typically cannot maintain rheological properties under HP/HT conditions.

In accordance with one aspect of the present invention, the Rheology Modifier comprises a terpolymer comprising about 30-70 wt. % Acrylamide (ACM), about 70-30 wt. % AMPS and about 0.01-5 wt. % of a hydrophobe. In accordance with particularly useful aspects of the present invention, the rheology modifier comprises a terpolymer comprising about 40-60 wt. % acrylamide, about 60-40 wt. % AMPS and about 0.01-5 wt. % of a hydrophobe. In accordance with another embodiment of the present invention, the polymer comprises approximately equal parts by weight acrylamide and AMPS. In certain embodiments, the hydrophobe may be present in an amount of about 0.05-3 wt %. The hydrophobe percentage is based on the total dry weight of the other two monomers (i.e., ACM and AMPS) of the terpolymer.

In accordance with certain aspects of the present invention, the hydrophobe may be an alkyl acrylate having a chain length for the alkyl group of from about 12-25, more particularly from about 16-20. The long chain alkyl group can be linear, branched or cycloalkyl. Examples of useful long alkyl acrylates include, but are not limited to, n-lauryl acrylate, n-hexadecyl acrylate and n-stearyl acrylate.

In accordance with certain aspects of the present invention, the Rheology Modifier exhibits improved salt-tolerance, temperature-stability, and shear thinning as compared to conventional rheology modifiers. The Rheology Modifier may be provided in aqueous dispersion or powder form to facilitate processing and the use of the modifier in water-based drilling muds as a salt-tolerant temperature-stable thickener.

The Rheology Modifiers described herein typically have a molecular weight (Mw) over 1,000,000 daltons, more particularly from about 2,000,000 to 20,000,000 daltons, and in certain cases from about 3,000,000 to 15,000,000 daltons as determined by GPC. One method for determining molecular weight is as follows: Samples are prepared as ~0.15% (w/v) solution of polymer in 50/50 water/methanol mobile phase. The sample is mixed on a rotating wheel until dissolved and then filtered and injected into the GPC system at 0.5 mL/min flow rate for analysis. Molecular weight values are determined relative to PEO/PEG standards injected in the beginning and end of the sample analysis. A Shodex degasser and Waters Empower 2 software interphased with Waters pump and auto-sampler can be used.

Moreover, the compositions can be produced at relatively high polymer solids (e.g., 15-35% in water dispersion form) while still providing acceptable bulk viscosity for processing the water dispersion (e.g., spray drying). The bulk viscosity of the dispersion polymer makes it practical to manufacture such rheology modifiers on commercial scale. The combination of high-molecular weight and incorporation of hydrophobes can be a key factor in the improved properties associated with the Rheology Modifier described herein.

Addition of the Rheology Modifier to a drilling fluid has been found to impart reduced Fluid Loss as well in addition to desired rheological characteristics for hole cleaning and weight material suspension. Furthermore, the rheological and leak-off reduction characteristics of solutions of the Rheology Modifier are very appropriate for its use in fracturing fluids.

Acidic treatment fluids may be viscosified to limit their rate of penetration into porous media, and the Rheology Modifier has been found to effectively dissolve in and gel 15% HCl (% by weight), an acid commonly used in stimulating carbonate reservoirs.

In the event that a large volume of wellbore fluid is being lost into high conductivity conduits in a rock formation, a lost circulation fluid comprising a Lost Circulation Material (LCM) suspended in a base fluid is pumped into the wellbore. The high conductivity conduits exposed in the walls of the wellbore are typically fissures, fractures or vugs that also extend deeply into the rock formation (where a vug is a cavity, void or large pore in a rock formation). Lost circulation fluids frequently comprise coarse particulate solids (LCM) in order to bridge and seal the high conductivity conduits, and these may usefully be suspended using the Rheology Modifier. Alternatively the Rheology Modifier solution may form part of a cross-linked gel that can seal the conduits.

Aqueous solutions of the Rheology Modifier exhibit an unusual combination of highly non-newtonian viscosity (high Yield Point using the Bingham Plastic model), high gel strengths and suspending ability, and excellent compatibility with most electrolyte solutions commonly encountered in wellbore operations. These attributes are ideally suited to the various wellbore fluid applications detailed above. Moreover, the Rheology Modifier does not suffer from the thermal degradation that limits polysaccharide based viscosifiers that can only be used in lower temperature wells (e.g. <300° F.).

As deeper and hotter reservoirs are targeted, traditional polymeric viscosifiers for water-based wellbore fluids such as the bacterially-produced biopolymers xanthan and welan gums are unfit for purpose where well temperatures exceed about 250° F. (~120° C.). By way of contrast solutions of the Rheology Modifier retain good rheological characteristics after exposure to temperatures of 350° F. (177° C.) and above. The Rheology Modifier is thus well suited for use in a wide variety of wellbore fluids and over a wide range of temperature conditions.

DETAILED DESCRIPTION

Figure 1:
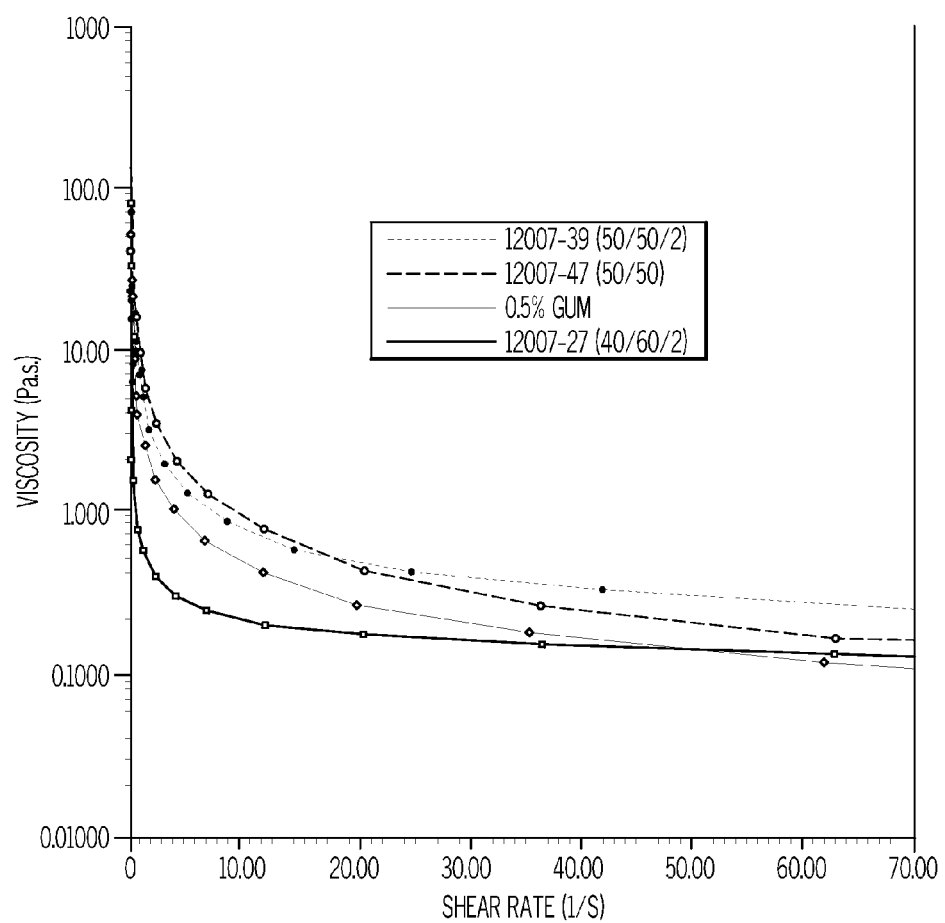
FIG. 1 illustrates the rheological profiles of various 1% polymer (actives wt.) in saturated NaCl solutions before aging; Data were obtained on an Advanced Rheometer using a shear rate ramp procedure.

The present application is directed to a salt-tolerant, thermally-stable rheology modifier and, in particular, to a polymer of an acrylamide, a sulfonic acid or salt thereof and a long-chain alkyl acrylate. In accordance with one aspect, the polymer composition comprises from about 30-70 wt. % of an acrylamide, 70-30 wt. % of a sulfonic acid or salt thereof, and 0.01-5 wt. % of a long-chain alkyl acrylate. In accordance with certain embodiments, the polymer is prepared using a dispersion polymerization process that produces a polymer having suitable rheological properties to be useful for typical oilfield applications in the presence of brines.

The rheology modifier described herein is particularly useful in oilfield drilling applications including, but not limited to, rheology modifier/thickener/suspension agent for drilling fluids and cementing, friction reducer (lime, freshwater, salt water muds), shale swell inhibitor/clay stabilizer, fluid loss additive for oilfield applications, viscosifier (fresh water, seawater, saline muds), filtration control, oil well fracturing (e.g. friction reducer), oil well stimulation (viscosifier for acidizing), drilling aids (oil, water, geological drillings), completion fluids and workover fluids, and polymer flooding (enhanced oil recovery).

The polymer can also find use in HI&I (household, industrial and institutional products) applications including, but not limited to, thickener of bleach (e.g. disinfectants, bleaching material, sterilization, washing concentrates, etc), alkaline environments (>KOH) gels (e.g., battery applications), thickener for hydrogen peroxide (e.g. antiseptics, disinfectants, sterilization agents, cleaners), thickener for acidic hard surface cleaners, air fresheners gel applications (thickener, fragrance delivery), controlled release of actives (antiseptics, biocides, fragrances), formation of clear gels for handwash and hair styling products.

The polymers described herein can also be used in adhesives, coatings and textiles. Examples of particular applications include, but are not limited to, latex adhesives and paints, water based resins (thickener), adhesive hardeners and catalysts (thickener, where extreme pH conditions are common). Additional applications include lubricants for the batch dyeing of textiles and thickeners for adhesives and defoamers.

The described polymers can also be used in applications relating to solid-liquid separation (flocculation). Specific applications include, but are not limited to, flocculation of municipal and industrial effluents, particularly at low or high pH, clarification of acidic and alkaline mining and mineral slurries, separation of oily waters, dewatering of paper slurries, and thickener for clay slurries and tailings.

Although the present application is primarily described with respect to polymer compositions comprising acrylamide, 2-acrylamido-2-methyl-propanesulfonic acid (AMPS) and a long-chain alkyl acrylate, it is believed that the present invention can be practiced utilizing other ethylenically unsaturated monomeric acrylamides and other monomeric sulfonic acids or salts as well as other hydrophobes. In accordance with certain embodiments, these other monomers can be used to produce a polymer capable of providing the attributes discussed in more detail below.

Examples of ethylenically unsaturated acrylamides include acrylamide, alkylacrylamide such as methacrylamide, and furmaramide. Other monomers believed to be useful include without limitation N-alkyl Substituted or N,N'-alkyl disubstituted amides such as: N-methyacrylamide, N,N'-dimethylacrylamide, N-isopropylacrylamide, N,N'-diethylacrylamide. N-(dimethylaminomethyl)acrylamide, N-(trimethylammoniummethyl)acrylamide, N-(trimethylammoniumpropyl)methacrylamide chloride, p-acrylamidomethylbenzyl bromide, p-acrylamidomethylbenzyl chloride, p-acrylamidomethylphenethyl chloride, p-acrylamidomethylphenethyl bromide, 3-acrylamidomethyl-p-xylyl chloride, 3-acrylamidomethyl-p-xylyl bromide, 3-methacrylamidomethyl-p-xylyl chloride, 3-methacrylamidomethyl-p-xylyl bromide, p-acrylamidomethyl-0-(2-bromethyl)-phenol, p-acrylamidomethyl-0-(2-chloroethyl)-phenol may also be useful.

Examples of sulfonic acids or salts can be summarized as shown in the following structure:

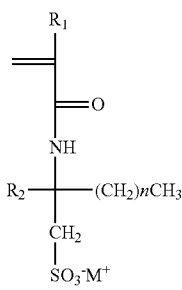

where $R_1$ and $R_2$ are independently hydrogen or methyl group ($CH_3$), n is a number from 0 to 18. M is H or metal salt Na, K, $NH_4$ etc. For example, when n=0, $R_1$ is H, $R_2$ is methyl, the structure represents acrylamidopropanesulfonic acid (AMPS) and when n=2, $R_1$ is H, $R_2$ is methyl, the structure represents acrylamidobutanesulfonic acid, etc.

Sulphonic acids or salts also include: vinyl sulfonic acid (VSA), styrenesulfonic acid (SSA), 2-sulfopropylmethacrylate, 2-sulfoethylacrylate (SEA).

Examples of sulfonate monomers also include: 2-chloroethylene sulfonic acid, ethylenesulfonic acid, ethylenedisulfonic acid, 1-nitriloethylenesulfonic acid, 2-formylethylenesulfonic acid, 1-carboxyethylenesulfonic acid, 1-propene-1-sulfonic acid, 1-propene-2-sulfonic acid, 2-formyl-1-methylethylene sulfonic acid, 1-carboxy-2-methylethylene sulfonic acid, 2-methyl-1,3-propenedisulfonic acid, 1-butene-1-sulfonic acid, 1-carboxy-2,2-dimethylethylene sulfonic acid, 1-pentene-1-sulfonic acid, 1-hexene-1-sulfonic acid, 2-(p-nitrophenyl)ethylene sulfonic acid, 2-phenylethylene sulfonic acid, 2-(p-hydroxyphenyl)ethylene sulfonic acid, 2-(2-aminophenyl)ethylene sulfonic acid, 1-methyl-2-phenylethylene sulfonic acid, 2-(p-methoxyphenyl)ethylene sulfonic acid, 4-phenyl-1,3-butadiene sulfonic acid, 2-(p-acetamidophenyl)ethylene sulfonic acid, 3-chloroallyl sulfonic acid, allyl sulfonic acid, 1-hydroxyallyl sulfonic acid, 2-cynoallyl sulfonic acid, 3-chloromethallyl sulfonic acid, 1-carboxyallyl sulfonic acid, 3-carboxyallyl sulfonic acid, methallyl sulfonic acid, 2-methylene-4,4-dimethyl-1,3-disulfo-pentene, 4-methylene-4,4-dimethyl pentene sulfonic acid, 1-hydroxy-3-phenylallyl sulfonic acid, 3-phenylallyl sulfonic acid, 2-benzylallyl sulfonic acid, 2-(p-methylphenoxy)allyl-sulfonic acid, 3-phenoxymethallyl sulfonic acid, 2-sulfoethyl acrylate, 2-sulfoethyl maleate, 3-sulfopropyl acrylate, 2-sulfonyl methacrylate, 3-sulfopropyl acrylate, 2-sulfo-1-(sulfomethyl)ethyl methacrylate, 3-sulfopropyl maleate, 4-sulfobutyl methacrylate, 2-(acyloxymethyl)-c-sulfuran, bis-2-sulfoethyl fumarate, 3-sulfopropyl itaconate, p-sulfophenyl acrylate, 2-(2-methylacryloxymethyl)-sulfofuran, bis(2-sulfoethyl)itaconate, p-sulfophenyl methacrylate, bis(3-sulfopropyl)maleate, bis(3-sulfopropyl)fumarate, bis(2-sulfopropyl)maleate, bis(2-sulfopropyl)fumarate, 5-methyl-2-(methallyloxy)benzene sulfonic acid, bis(2-sulfopropyl)itaconate, ar-(2-acryloyloxyethoxy)-2-naphthalene sulfonic acid, ar-(2-methacryloyloxyethoxy)-naphthalene sulfonic acid, dodecyl-4-sulfopropyl itaconate, dodecyl-4-sulfobutyl itaconate, n-acryloyl taurine, allylthioethyl sulfonic acid, alloxy propene sulfonic acid, n-allyl-n-methylaminoethane-sulfonic acid, n-(meth-acrylamidomethyl)-sulfoacetamide, vinyloxybenzene sulfonic acid, n-(p-sulfophenyl)methacrylamide, p-[(2-vinylsulfonyl)ethoxy]-benzene sulfonic acid, n-methyl-n-(2-vinylsulfonyl-ethyl)-p-(sodiumsulfo) benzyl amine, dichlorostyrene sulfonic acid, 2-chlorostyrene sulfonic acid, p-styrene sulfonic acid, p-sulfonic acid, vinyltoluene sulfonic acid, 2-methyl styrene sulfonic acid, the potassium, sodium and ammonium salts of each of the foregoing compounds, 4-methylene-2,2,6,6-tetramethyl-3,5-disulfoheptene, allyloxyethyl sulfonic acid, allyl oxybenzene sulfonic acid, and styrene sulfonic acid.

Phosphonic acid and salts may also be useful in accordance with certain aspects. Examples of phosphonic acids or salts can be represented by following structure:

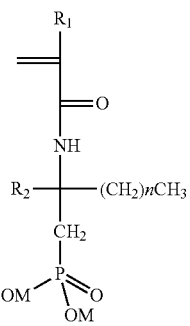

where R1 and R2 are independently hydrogen or methyl group (CH3), n is a number from 0 to 18. M is H or a metal salt such as Na, K, etc.

Examples of phosphonic acid and phosphonate monomers include without limitation: vinylidene diphosphonic acid, vinylphosphonic acid (VPA), styrenephosphonic acid (SPA), 4-vinylbenzylphoshonic acid (VBPA), or α-phenylvinylphosphonic acid (PVPA).

Suitable hydrophobic monomers, with the alkyl chain in linear, branched, or cyclic form, include without limitation the higher alkyl esters of α,β-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, the ethyl half ester of maleic anhydride, diethyl maleate, and other alkyl esters derived from the reactions of alkanols having from 8 to 25 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-o-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; α-olefins such as 1-octene, 1-decene, 1-dodecene and 1-hexadecene; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and ar-alkylstyrenes such as t-butyl styrene. Of the foregoing hydrophobic monomers, the alkyl esters of acrylic acid and methacrylic acid wherein the alkyl has from 8 to 25 carbon atoms are preferred. The alkyl acrylates wherein the alkyl has from 16 to 20 carbon atoms are more preferred. Octadecyl acrylate is the most preferred. Such long chain acrylate could be in the linear or branched form for alkyl chains.

The polymers according to the invention may be readily synthesized by procedures known by those skilled in the art, and include free radical polymerization, solution polymerization, emulsion polymerization, and inverse emulsion polymerization (including Liquid dispersion polymerization (LDP), and "dispersion polymerization" (water-in water)). Dispersion polymerization is a particularly useful method for producing the polymers described herein. "Dispersion polymer" means a water-soluble polymer dispersed in an aqueous continuous phase containing one or more inorganic salts. In the process of dispersion polymerization, the monomer and the initiator are both soluble in the polymerization medium, but the medium is a poor solvent for the resulting polymer. Accordingly, the reaction mixture is homogeneous at the onset, and polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by the polymerization medium and/or the monomer, leading to the formation of spherical particles. Typically, the particles range from about 0.1-500 microns, more particularly from about 1-200 microns.

In dispersion polymerization, the variables that are usually controlled are the concentrations of the stabilizer, the monomer and the initiator, solvency of the dispersion medium, and the reaction temperature and choice of initiator. It has been found that these variables can have a significant effect on the particle size, the molecular weight of the final polymer particles, and the kinetics of the polymerization process.

Particles produced by dispersion polymerization in the absence of any stabilizer are not sufficiently stable and may coagulate after their formation. Addition of a small percentage of a suitable stabilizer to the polymerization mixture produces stable dispersion particles. Particle stabilization in dispersion polymerization is usually referred to as "steric stabilization". Good stabilizers for dispersion polymerization are polymer or oligomer compounds with low solubility in the polymerization medium and moderate affinity for the polymer particles.

Typically, as the stabilizer concentration is increased, the particle size decreases, which implies that the number of nuclei formed increases with increasing stabilizer concentration.

As the solvency of the dispersion medium increases, (a) the oligomers will grow to a larger MW before they become a precursor nuclei, (b) the anchoring of the stabilizer moiety will probably be reduced and (c) the particle size increases. As the initiator concentration is increased, it has been observed that the final particle size increases. As for the kinetics, it is reported that when the dispersion medium is a non-solvent for the polymer being formed, then the locus of polymerization is largely within the growing particles and the system follows the bulk polymerization kinetics, n (the kinetic chain length)=Rp/Rt, where Rp is the propagation rate and Rt is the termination rate. As the solvency of the dispersion medium for the growing polymer particle is increased, polymer growth proceeds in solution. The polymeric radicals that are formed in solution are then captured by growing particles. Consequently, the locus of the particle polymerization process changes and there is a concomitant change in the kinetics of polymerization.

Stabilizers as used herein include anionically charged water soluble polymers having a molecular weight of from about 100,000 to about 5,000,000 daltons and preferably from about 1,000,000 to about 3,000,000 daltons. The stabilizer polymer should be soluble or slightly soluble in the salt solution, and should be soluble in water.

Particularly useful stabilizers include polyacrylic acid, poly(meth)acrylic acid, poly(2-acrylamido-2-methyl-1-propanesulfonic acid) and copolymers of 2-acrylamido-2-methyl-1-propanesulfonic acid and an anionic comonomer selected from acrylic acid and methacrylic acid.

The stabilizer polymers may be prepared using conventional solution polymerization techniques, are prepared in water-in-oil emulsion form or are prepared in accordance with the dispersion polymerization techniques described herein. The choice of a particular stabilizer polymer will be based upon the particular polymer being produced, the particular salts contains in the salt solution, and the other reaction conditions to which the dispersion is subjected during the formation of the polymer.

Preferably from about 0.1 to about 10 percent by weight, more preferably from about 0.5 to about 7 percent and still more preferably, from about 2 to about 5 percent by weight of stabilizer, based on the weight of the total dispersion polymer solids is utilized.

The remainder of the dispersion comprises an aqueous solution containing from about 10 to about 40 weight percent based on the total weight of the dispersion of a water soluble salt selected from the group consisting of ammonium, alkali metal and alkaline earth metal halides, sulfates, and phosphates.

The salt is important in that the polymer produced in such aqueous media will be rendered insoluble on formation, and polymerization will accordingly produce particles of water soluble polymer when suitable agitation is provided. The selection of the particular salt to be utilized is dependent upon the particular polymer to be produced, and the stabilizer to be employed. The selection of salt, and the amount of salt present should be made such that the polymer being produced will be insoluble in the salt solution.

Particularly useful salts include a mixture of ammonium sulfate and sodium sulfate in such quantity to saturate the aqueous solution. Salts containing di- or trivalent anions are particularly useful because of their reduced solubility in water as compared to for example alkali, alkaline earth, or ammonium halide salts, although monovalent anion salts may be employed in certain circumstances. The use of salts containing di- or trivalent anions generally results in polymer dispersions having lower percentages of salt materials as compared to salts containing monovalent anions.

The particular salt to be utilized is determined by preparing a saturated solution of the salt or salts, and determining the solubility of the desired stabilizer and the desired polymer. Preferably from about 5 to about 30, more preferably from about 5 to about 25 and still more preferably from about 8 to about 20 weight percent based on the weight of the dispersion of the salt is utilized. When using higher quantities of monomer less salt will be required.

In addition to the above, other ingredients may be employed in making the polymer dispersions of the present invention. These additional ingredients may include chelating agents designed to remove metallic impurities from interfering with the activity of the free radical catalyst employed, chain transfer agents to regulate molecular weight, nucleating agents, and co-dispersant materials. Nucleating agents when utilized generally encompass a small amount of the same polymer to be produced. Thus if a polymer containing 70 mole percent acrylic acid (or its water soluble salts) and 30 percent acrylamide were to be produced, a nucleating agent or "seed" of the same or similar polymer composition may be utilized. Generally up to about 10 weight percent, preferably about 0.1 to about 5, more preferably from about 0.5 to about 4 and still more preferably from about 0.75 to about 2 weight percent of a nucleating agent is used based on the polymer contains in the dispersion is utilized.

Co-dispersant materials that may be utilized include dispersants from the classes consisting of water soluble sugars, polyethylene glycols having a molecular weight of from about 2000 to about 50,000, and other polyhydric alcohol type materials. Amines and polyamines having from 2-12 carbon atoms are often times also useful as co-dispersant materials, but, must be used with caution because they may also act as chain transfer agents during polymerization. The function of a co-dispersant is to act as a colloidal stabilizer during the early stages of polymerization. The use of co-dispersant materials is optional, and not required to obtain the polymer dispersions of the invention. When utilized, the co-dispersant may be present at a level of up to about 10, preferably from about 0.1-4 and more preferably from about 0.2-2 weight percent based on the dispersion.

The total amount of water soluble polymer prepared from the anionic and the nonionic water soluble monomers in the dispersion may vary from about 5 to about 50 percent by weight of the total weight of the dispersion, and preferably from about 10 to about 40 percent by weight of the dispersion. Most preferably the dispersion contains from about 15 to about 30 percent by weight of the polymer prepared from the nonionic and anionic water soluble monomers.

Polymerization reactions described herein may be initiated by any means which results in generation of a suitable free-radical. Thermally derived radicals, in which the radical species results from thermal, homolytic dissociation of an azo, peroxide, hydroperoxide and perester compound are preferred. Especially preferred initiators are azo compounds including 2,2'-azobis (2-amidinopropane) dihydrochloride, 2,2'-azobis[2-(2-imidazolin-2-yl)propane]dihydrochloride, 2,2'-azobis (isobutyronitrile) (AIBN), 2,2'-azobis (2,4-dimethylvaleronitrile) (AIVN), and the like.

The monomers may be mixed together with the water, salt and stabilizer prior to polymerization, or alternatively, one or both monomers may be added stepwise during polymerization in order to obtain proper incorporation of the monomers into the resultant dispersion polymer. Polymerizations of this invention may be run at temperatures ranging from −10° C. to as high as the boiling point of the monomers employed. Preferably, the dispersion polymerization is conducted at from −10° C. to about 80° C. More preferably, polymerization is conducted at from about 20° C. to about 60° C.

The dispersion polymers of this invention are prepared at a pH greater than 5, preferably at a pH of about 7-9. After polymerization the pH of the dispersion may be adjusted to any desired value as long as the polymer remains insoluble to maintain the dispersed nature. Preferably, polymerization is conducted under inert atmosphere with sufficient agitation to maintain the dispersion.

The polymer dispersions made through the "dispersion polymerization" process of the instant invention typically have apparent solution viscosities of less than about 50,000 cps at 25° C. (Brookfield), more preferably less than 30,000 cps and still more preferably less than about 20,000 cps and in certain embodiments from about 300-10000 cps. At these viscosities, the polymer dispersions are easily handled in conventional polymerization equipment and are suitable for subsequent manufacturing processing (e.g. drum and spray drying).

In accordance with certain embodiments, the polymers described herein produced through a dispersion polymerization process exhibit excellent thickening and salt tolerance. More particularly, the polymer may be characterized by a thickening efficiency suitable for typical oilfield applications in the presence of brines. Thickening efficiency provides a measure of how well the polymer can increase and maintain the viscosity of a saturated KCl or NaCl solution. The polymers described herein typically provide a viscosity of about 400 cps or more, more particularly about 500 cps or more, when present at a concentration of 1% by weight in a saturated KCl or NaCl aqueous solution. Brookfield Viscosity can be measured using a conventional Brookfield RV or LV viscometer with a suitable spindle (such as a number 3 or 63 spindle) at 20° C. In accordance with one method for testing viscosity, 1% polymer solutions, in fresh water and saturated NaCl respectively, were prepared and tumbled on an Eberbach shaker overnight. The viscosity of each solution was measured on a Brookfield viscometer using a #63 spindle at 20 RPM.

A powdered polymer thickener product can be made through drying (e.g., vacuum drying, spray drying, belt drying, drum drying, etc.) the above mentioned polymer dispersions. Powdered polymers can also be manufactured through drying the solutions, emulsions, inverse emulsions or suspensions described in the following text.

In another aspect, this invention is directed to a method of preparing a high molecular weight dispersion polymer having a bulk Brookfield viscosity of from about 100 to about 25,000 cps at 25° C. comprising a) adding an initiator to an aqueous mixture comprising: i) from about 10 to about 40 weight percent of a mixture comprising 10-45 mole percent of Na AMPS and 55-90 mole percent of acrylamide and about 0.01-5 wt % based on the weight of Na AMPS and acrylamide of a long-chain alkyl acrylate having a chain length for the alkyl group of from 12-25; ii) from about 0.1 to about 10 weight percent based on the total weight of the dispersion of a stabilizer; and iii) from about 10 to about 40 weight percent based on the weight of the dispersion of a water soluble salt selected from the group consisting of ammonium, alkali metal and alkaline earth metal halides, sulfates, and phosphates; and b) polymerizing the monomers.

Free radical polymerization is another useful polymerization method, especially when using water-dispersible and/or water-soluble reaction solvent(s), and is described in "Decomposition Rate of Organic Free Radical Polymerization" by K. W. Dixon (section II in Polymer Handbook, volume 1, 4th edition, Wiley-Interscience, 1999), which is incorporated by reference.

Compounds capable of initiating the free-radical polymerization include those materials known to function in the prescribed manner, and include the peroxo and azo classes of materials. Exemplary peroxo and azo compounds include, but are not limited to: acetyl peroxide; azo bis-(2-amidinopropane) dihydrochloride; azo bis-isobutyronitrile; 2,2'-azo bis-(2-methylbutyronitrile); benzoyl peroxide; di-tert-amyl peroxide; di-tert-butyl diperphthalate; butyl peroctoate; tert-butyl dicumyl peroxide; tert-butyl hydroperoxide; tert-butyl perbenzoate; tert-butyl permaleate; tert-butyl perisobutyl-rate; tert-butyl peracetate; tert-butyl perpivalate; para-chlorobenzoyl peroxide; cumene hydroperoxide; diacetyl peroxide; dibenzoyl peroxide; dicumyl peroxide; didecanoyl peroxide; dilauroyl peroxide; diisopropyl peroxodicarbamate; dioctanoyl peroxide; lauroyl peroxide; octanoyl peroxide; succinyl peroxide; and bis-(ortho-toluoyl) peroxide.

Also suitable to initiate the free-radical polymerization are initiator mixtures or redox initiator systems, including: ascorbic acid/iron (II) sulfate/sodium peroxodisulfate, tert-butyl hydroperoxide/sodium disulfite, and tert-butyl hydroperoxide/sodium hydroxymethanesulfinate.

Alternatively, monomer units may be polymerized concurrently together, using an appropriate initiator and optional solvent(s). Alternatively, the polymerization reaction may be initiated with one or more of the monomers, the reaction temporarily slowed or stopped, and then reinitiated upon the addition of more or different monomers and initiator.

The initiators are often called "free radical initiators." Various decomposition methods of the initiators are discussed first, followed by a description of the emulsion, solution, and suspension polymerization methods. The initiator can be decomposed homolytically to form free radicals. Homolytic decomposition of the initiator can be induced by using heat energy (thermolysis), using light energy (photolysis), or using appropriate catalysts. Light energy can be supplied by means of visible or ultraviolet sources, including low intensity fluorescent black light lamps, medium pressure mercury arc lamps, and germicidal mercury lamps.

Catalyst induced homolytic decomposition of the initiator typically involves an electron transfer mechanism resulting in a reduction-oxidation (redox) reaction. This redox method of initiation is described in Elias, Chapter 20 (detailed below). Initiators such as persulfates, peroxides, and hydroperoxides are more susceptible to this type of decomposition. Useful catalysts include, but are not limited to, (1) amines, (2) metal ions used in combination with peroxide or hydroperoxide initiators, and (3) bisulfite or mercapto-based compounds used in combination with persulfate initiators.

Presently, preferred methods of initiation comprise thermolysis or catalysis. Thermolysis has an additional advantage in that it provides ease of control of the reaction rate and exotherm.

Useful initiators are described in Chapters 20 & 21 Macromolecules, Vol. 2, 2nd Ed., H. G. Elias, Plenum Press, 1984, New York. Useful thermal initiators include, but are not limited to, the following: (1) azo compounds such as 2,2-azo-bis-(isobutyronitrile), dimethyl 2,2'-azo-bis-isobutyrate, azo-bis-(diphenyl methane), 4-4'-azo-bis-(4-cyanopentanoic acid); (2) peroxides such as benzoyl peroxide, cumyl peroxide, tert-butyl peroxide, cyclohexanone peroxide, glutaric acid peroxide, lauroyl peroxide, methyl ethyl ketone peroxide; (3) hydrogen peroxide and hydroperoxides such as tert-butyl hydroperoxide and cumene hydroperoxide; (4) peracids such as peracetic acid and perbenzoic acid; potassium persulfate; ammonium persulfate; and (5) peresters such as diisopropyl percarbonate.

Useful photochemical initiators include but are not limited to benzoin ethers such as diethoxyacetophenone, oximino-ketones, acylphosphine oxides, diaryl ketones such as benzophenone and 2-isopropyl thioxanthone, benzyl and quinone derivatives, and 3-ketocoumarins as described by S. P. Pappas, J. Rad. Cur., July 1987, p. 6.

Various other polymerization methods are summarized below that may be employed to synthesize the polymer.

Solution Polymerization and Optional Inversion

The polymers of the present invention can be made by solution polymerization followed by an optional inversion step. In one illustrative solution polymerization method, the monomers and suitable inert solvents are charged into a reaction vessel. The monomers and the resultant copolymers are soluble in the solvent. After the monomers are charged, an initiator, preferably a thermal free radical initiator is added. The vessel is purged with nitrogen to create an inert atmosphere. The reaction is allowed to proceed, typically using elevated temperatures, to achieve a desired conversion of the monomers to the copolymer. In solution polymerization, preferably the initiator used comprises a thermally decomposed azo or peroxide compound for reasons of solubility and control of the reaction rate.

Suitable solvents for solution polymerizations include but are not limited to (1) esters such as ethyl acetate and butyl acetate; (2) ketones such as methyl ethyl ketone and acetone; (3) alcohols such as methanol and ethanol; (4) aliphatic and aromatic hydrocarbons; and mixtures of one or more of these. The solvent, however, may be any substance which is liquid in a temperature range of about −10° C. to 50° C., does not interfere with the energy source or catalyst used to dissociate the initiator to form free radicals, is inert to the reactants and product, and will not otherwise adversely affect the reaction. The amount of solvent, when used, is generally about 30% to 80% (w/w) based on the total weight of the reactants and solvent. Preferably, the amount of solvent ranges from about 40% to 65% (w/w), based upon the total weight of the reactants and solvent, to yield fast reaction times.

Polymers prepared by solution polymerization optionally can be inverted to yield dispersions of small average particle size, typically less than about one micrometer, preferably less than about 0.5 micrometer.

In accordance with certain aspects, the polymer may be prepared in a water-miscible solvent which has a boiling point below 100° C. such as ethylene glycol. Alternatively, a non-water-miscible polymerization solvent such as ethyl acetate may be used. The non-water-miscible polymerization solvent may be removed from the polymer by using a rotary evaporator. The resulting polymer can then be dissolved in a water-miscible solvent such as those described above or mixtures including isopropanol, methanol, ethanol, and tetrahydrofuran.

The resulting solutions are added with stirring to an aqueous solution of a base, (in the case of polymers containing acidic functionality), or an acid (in the case of polymers containing basic functionality). Alternatively, the base or acid can be added to the polymer solution prior to adding water or adding to water. Suitable bases include (1) ammonia and organic amines, such as aminomethyl propanol, triethyl amine, triethanol amine, methyl amine, morpholine, and (2) metal hydroxides, oxides, and carbonates, etc. Suitable acids include (1) carboxylic acids such as acetic acid, and (2) mineral acids, such as HCl. In the case of a volatile weak base (e.g., ammonia) or acid (e.g., acetic acid), the ionic group formed (an ammonium carboxylate) is non-permanent in nature. For example, for an acrylic acid containing polymer neutralized with aqueous ammonia, the polymer remains as the ammonium acrylate derivative when dispersed in water, but is thought to revert to its original free acid state as the coating dries on the surface. This is because there is an equilibrium between the neutralized and free acid which is shifted towards the free acid as the ammonia is driven off on drying. Acid or base at less than an equivalent is preferably used, more preferably at slightly less than an equivalent, to ensure near neutral pH and thus providing the lowest potential for skin irritation.

Suspension Polymerization

The polymers of the present invention can be made by a suspension polymerization method in the absence of surfactants. Instead, colloidal silica in combination with a promoter is used as the stabilizer. Using this process, surfactant-free copolymers can be obtained with a relatively narrow particle size distribution. The preferred method involves making a monomer premix comprising the first, second, and third monomer. The premix is combined with a water phase, preferably deionized water, containing colloidal silica, and a promoter. Amphiphilic polymers represent one class of useful promoters.

The pH of the mixture is adjusted so as to be in the range of 3 to 11, preferably in the range of 4 to 6, without coagulation of the particles. For certain monomers, the initial pH of the mixture can be as low as about 2.5. This pH is low enough for the colloidal silica to stabilize the monomer droplet, but the final product may contain a small amount of coagulum. Similar observation can be made at very high pH. It has been observed that when the mixture is treated with ammonia or hydrochloric acid to about pH 4 to 6, the reaction is more stable and the final product is basically free of coagulum.

The mixture is exposed to high shear, such as that capable in a Waring™ blender, to break the monomer droplets down to a diameter size of 1 micrometer or less. The shearing action is then reduced to a lower agitation (or temporarily stopped) to allow for the partial coalescence of the small droplets and formation of a suspension. Initiator is added. The silica-promoter mixture stabilizes the droplets and limits their coalescence yielding very uniform, and sometimes nearly monodisperse particles. The suspension polymerization is completed under moderate agitation and a stable, aqueous dispersion is obtained.

The above described suspension polymerization has several advantages. For example, the method yields a polymer with a narrow distribution of mean particle size and limited coalescence. When coalescence is present, the particles tend to migrate towards one another and can form large masses. Coalescence hampers the handling and transportation of the particles and thus is undesirable. The particles are sterically stabilized by the colloidal silica.

Emulsion Polymerization

The polymers of the present invention can be made by emulsion polymerization. In general, it is a process where the monomers are dispersed in a continuous phase (typically water) with the aid of an emulsifier and polymerized with the free-radical initiators described above. Other components that are often used in this process include stabilizers (e.g., copolymerizable surfactants), chain transfer agents for minimizing and/or controlling the polymer molecular weight, and catalysts. The product of this type of polymerization is typically a colloidal dispersion of the polymer particles, often referred to as "latex." In one preferred emulsion polymerization process, a redox chemistry catalyst, such as sodium metabisulfite, used in combination with potassium persulfate initiator and ferrous sulfate heptahydrate, is used to start the polymerization at or near room temperature. Typically, the copolymer particle size is less than one micrometer, preferably less than 0.5 micrometer.

Emulsion polymerization can be carried out in several different processes. For example, in a batch process the components are charged into the reactor at or near the beginning. In a semi-continuous process, a portion of the monomer composition is initially polymerized to form a "seed" and the remaining monomer composition is metered in and reacted over an extended time. In one exemplary multistage process, a seed polymer of one monomer composition (or one molecular weight distribution) is used to nucleate the polymerization of a second monomer composition (or the same composition with a different molecular weight distribution) forming a heterogeneous polymer particle. These emulsion polymerization techniques are well known by those skilled in the art and are widely used in industry.

Inverse Emulsion Polymerization

The polymers described herein can also be made through an Inverse Emulsion Polymerization process. Inverse emulsion polymerizations may be conducted by dissolving the desired monomers (e.g., Acrylamide and AMPS) in an aqueous phase, dissolving an emulsifying agent(s) (e.g., surfactant) in the oil phase (e.g., low boiling point solvent or mineral or vegetable oils), emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion.

In oilfield applications any convenient concentration of Rheology Modifier can be used, so long as it is effective in its purpose. Generally, the Rheology Modifier is used in an amount of about 0.05% to about 5%, more particularly about 0.1% to about 3% and in certain cases about 0.5% to about 2% by weight based on total formulation. The compositions also may include (without limitation) one or more viscosifiers and protective agents to achieve and maintain proper rheology of the fluids. It is contemplated that higher concentrations may be preferred in some applications. Nonetheless, it is understood that the actual concentration will vary, depending upon many parameters. A suitable concentration for a particular application, however, can be determined by those skilled in the art by taking into account the rheology modifier's performance under such application.

Unless otherwise specified, the concentrations of Rheology Modifier detailed herein refer to the concentration of active polymer per unit volume. In practice the Rheology Modifier may be utilized in the form of an aqueous dispersion polymer as an emulsion polymer wherein the polymer concentration in the liquid product may be less than 50% by weight or as a dilute solution in water which could be diluted from a more concentrated aqueous solution or from a powdered form. In accordance with some aspects, the Rheological Modifier may be present in the wellbore fluids at a dose of between 0.5 g/l and 50 g/l (between 0.175 ppb and 17.5 ppb where ppb means pounds per barrel) unless the application of the Rheology Modifier is as a friction reducer where lower doses such as between 0.001-0.5 g/l (0.0035-0.175 ppb) are effective at reducing turbulence and pressure losses. More particularly, the Rheological Modifier may be present in the wellbore fluid at a dose of between 1.0 g/l and 24 g/l (0.35 ppb and 8.4 ppb).

Particular features of the wellbore fluids in accordance with certain aspects of the present invention will now be described below.

The base fluid of the wellbore fluid may be water, seawater or a solution of a salt or a solution of a combination of salts. Generally, the base fluid is present in the wellbore fluid in an amount in the range of from about 30 to 99% by weight of the fluid, preferably about 50 to 97% by weight.

The base fluid may be an aqueous solution of one or more density-increasing water-soluble salt. The density increasing water-soluble salt may be selected from the group consisting of alkali metal halides (for example, sodium chloride, sodium bromide, potassium chloride and potassium bromide) alkali metal carboxylates (for example, sodium formate, potassium formate, caesium formate, sodium acetate, potassium acetate or caesium acetate), sodium carbonate, potassium carbonate, alkaline earth metal halides (for example, calcium chloride and calcium bromide), and zinc halide salts.

Alternatively, density control may be provided to the water-based wellbore fluid using insoluble weighting agents. Suitable weighting agents include suspended dense mineral particles such as ground barite, iron oxides (for example, haematite), ilmenite, calcite, magnesite (MgCO3), dolomite, olivine, siderite, hausmannite ($Mn_3O_4$) or suspended metal particles.

Examples of additives that may be added to the aqueous based wellbore fluids include the clays bentonite, attapulgite, hectorite, sepiolite, and the synthetic minerals Laponite™ (a synthetic hectorite ex Rockwood Additives Limited) and mixed metal hydroxides. Other clays which may be present in the fluids include kaolinite and illite which can be contaminants arising from drilled shale formations. Some of the shale cuttings inevitably become dispersed in a wellbore fluid as fine illite and kaolinite clay particles.

The wellbore fluids may additionally comprise a particulate bridging agent, for example acid-soluble materials such as calcium carbonate, water-soluble particles such as alkali metal halides; and sparingly water-soluble materials such as Ulexite (a sodium calcium borate salt) and magnesium salts of carboxylic acids. Where the particulate bridging agent is comprised of a water-soluble or sparingly water-soluble material, it is employed in an aqueous based fluid in amounts above the saturation concentration of the water-soluble or sparingly water-soluble material in water at the conditions encountered downhole so as to provide suspended particles of the conventional particulate bridging agent. Other suspended solids can include graphite particles, cellulose fibers, and mica flakes.

The aqueous based wellbore fluid may comprise additional additives for improving the performance of the wellbore fluid with respect to one or more properties. Examples include: pH control agents such as calcium hydroxide, magnesium hydroxide, magnesium oxide, potassium hydroxide, sodium hydroxide and citric acid; clay or shale hydration inhibitors (such as polyalkylene glycols), bactericides, detergents and emulsifiers, solid and liquid lubricants, gas-hydrate inhibitors, corrosion inhibitors, oxygen scavengers, defoamers, scale inhibitors, enzymes, oxidising polymer-breakers, emulsified hydrophobic liquids such as oils, acid gas-scavengers (such as hydrogen sulfide scavengers), thinners (such as lignosulfonates), demulsifiers and surfactants designed to assist the clean-up of invaded fluid from producing formations.

Besides the Rheology Modifier, other water-soluble polymers may be added to the water-based wellbore fluid to impart viscous properties, solids-dispersion and/or filtration control to the fluid. A wide range of water-soluble polymers may be used including cellulose derivatives such as carboxymethyl cellulose, hydroxyethylcellulose, carboxymethylhydroxyethyl cellulose, sulphoethylcellulose; starch derivatives (which may be cross-linked) including carboxymethyl starch, hydroxyethylstarch, hydroxypropyl starch; bacterial gums including xanthan, welan, diutan, succinoglycan, scleroglucan, dextran, pullulan; plant derived gums such as guar gum, locust-bean gum, tara gum and their derivatives; synthetic polymers and copolymers other than the Rheology Modifier.

Synthetic water-soluble homopolymers and copolymers can be used in conjunction with the Rheology Modifier to viscosify a fluid and/or as a fluid loss reducer, or as an encapsulating polymer to reduce the rate of shale hydration and cuttings dispersion. Such synthetic (co)polymers are typically based on one or more monomers selected from the group consisting of acrylic acid, methacrylic acid, hydroxyethylmethacrylic acid, hydroxypropylmethacrylic acid; acrylamide, N,N-dimethylacrylamide, maleic acid or maleic anhydride, fumaric acid, itaconic acid, vinyl acetate, 2-acrylamido-2-methyl propane sulfonic acid (AMPS), 2-acrylamidoethane sulfonic acid, 2-acrylamidopropane sulfonic acid, 3-methacrylamidopropane sulfonic acid, styrene sulphonic acid, vinylsulfonic acid, allyl sulfonic acid, methallyl sulfonic acid, vinylbenzyl sulfonic acid, N-vinyl formamide, N-vinyl acetamide, N-vinyl pyrrolidone, N-vinyl caprolactone and N,N-dimethylacrylamide, N-vinylpyridine and other cationic vinylic monomers (for example, diallyldimethylammonium chloride, DADMAC). Typically, alkali metal, ammonium or amine salts of the acidic functional groups in the (co)polymer are used in the wellbore fluids.

Frequently these synthetic (co)polymers have a number average molecular weight in the range 100,000 to 20,000,000 daltons, although molecular weights lower than 100,000 are of value where it is desired that the (co)polymer exert a useful solids-dispersing effect.

Another class of viscosifying agents that may be used with the Rheology Modifier is that of viscoelastic surfactants (VESs). VESs are used in wellbore fluids where easy clean-up of the fluid after use is needed. Examples include a gravel-pack carrier fluid and a fracturing fluid. The Rheology Modifier may extend VES-based fluids and allow their use at higher temperatures than heretofore obtainable.

Other examples of Fluid loss Reducers that can be used along with the rheology modifier include asphalts (for example sulfonated asphalts); gilsonite; lignite (humic acid) and its derivatives such as sulfomethylated lignite; lignin derivatives such as lignin sulfonates and condensed polymeric lignin sulfonates.

Dispersants for solids suspended in the fluid (also known as thinners) can be used in conjunction with the Rheology Modifier. Such dispersants include lignosulfonates, polyphosphates, tannins and/or quebracho extract, sulfomethylated tannins. Other useful dispersants include synthetic water-soluble polyanionic polymers such as sodium polyacrylate and other largely anionic (co)polymers produced from the monomers listed above and having a number average molecular weight, Mn, in the range 1,000 to 100,000, more typically 3,000 to 30,000.

Shale hydration inhibitors will often be used in conjunction with the Rheology Modifier. These include partially hydrolyzed polyacrylamide or copolymers of acrylamide and acrylic acid, polyalkyleneglycols, polyinylpyrrolidone or N-vinylpyrrolidone copolymers, polyamines, amine end-capped polyalkyleneglycols, at least partially cationic polymers derived from cationic monomers such as diallyl dimethyl ammonium chloride, and organic cations such as tetramethylammonium and choline cations.

Substantially water-insoluble polyalkylene glycols, such as polypropylene glycols (PPGs) having a molecular weight above about 1,000, have utility as defoamers, and also as lubricants for the bit and drill-string. PPGs may be incorporated in a fluid together with the Rheology Modifier.

Aqueous-based fluids comprising the Rheology Modifier may contain some added oil such as a refined petroleum fraction, a mineral oil, a synthetic hydrocarbon, or any suitable non-hydrocarbon liquid that is substantially water-insoluble. Usually the added oil is biodegradable and is of low toxicity. Examples of such oils include the biodegradable ester base fluids that are used in environmentally-friendly ester-oil-based drilling fluids, triglycerides such as rapeseed oil, linear alphaolefins, internal olefins and n-alkanes. The added oil phase may improve lubricity, fluid loss, and will reduce the density of the fluid.

Dispersed gas bubbles such as nitrogen and air can also be used to reduce the density of a wellbore fluid comprising the Rheology Modifier, and foam or aphrons can aid in diverting treatment fluids or reducing leak-off.

Where the wellbore fluid comprising the Rheology Modifier is an acidic treatment fluid, the acid may be a mineral acid such as hydrochloric acid, hydrofluoric acid, and sulfamic acid; or an organic carboxylic acid such as formic acid, acetic acid, and citric acid; or partially neutralised polycarboxylic acid sequestrants such as EDTA di-potassium salt or a biodegradable sequestrant alternative such as L-glutamic acid N,N-diacetic acid di-potassium salt; or readily hydrolysable acid precursors such as formate esters, acetate esters, orthoformate esters, and particles of polyesters such as poly(lactic acid).

Besides the wide variety of wellbore fluids that can usefully comprise the Rheology Modifier, the combination of improved thermal stability and electrolyte tolerance exhibited by the Rheology Modifier enables improved methods of performing wellbore operations.

Water-based drilling fluids generally comprise an aqueous base fluid such as fresh water or sea water, a weight material capable of increasing the density of the fluid such as a particulate dense mineral suspended in the fluid or a salt dissolved in the fluid, material(s) capable of increasing the viscosity and gel strength, and material(s) that reduce the filtration rate (Fluid Loss) of the drilling fluid. The Rheology Modifier has been found to effectively increase the viscosity/gels and reduce the Fluid Loss of aqueous drilling fluids over a wide range of conditions.

Accordingly, in a particularly useful embodiment of the present invention there is provided a method of drilling a wellbore through a subterranean rock formation comprising:

mixing a drilling fluid comprising an aqueous base fluid, a weight material, and between 0.5 g/l and 24 g/l (0.175 ppb and 8.4 ppb) of the Rheology Modifier; pumping said drilling fluid into tubing placed in the wellbore and through nozzles in a drilling bit attached to the bottom end of the tubing while rotating the bit to detach cuttings from the rock formation; transporting the cuttings up the annulus between the tubing and the wellbore wall, the cuttings transport being facilitated by the flow of Rheology-Modified drilling fluid; using apparatus to remove the cuttings from the drilling fluid after it exits the wellbore on surface; followed by pumping the cleaned drilling fluid again down the tubing thereby repeating the process until the desired interval of rock formation has been drilled.

An advantage of this embodiment is that the filtration control and rheological properties of the drilling fluid can be maintained at much higher temperatures in the wellbore than have been obtainable using viscosifiers and fluid loss reducers based on polysaccharide polymers.

Water-based completion fluids and water-based workover fluids often comprise an aqueous base fluid such as fresh water or sea water, a weight material capable of increasing the density of the fluid such as a particulate mineral suspended in the fluid (such as calcium carbonate that may ultimately be dissolved in acids) or a salt dissolved in the fluid, material(s) capable of increasing the viscosity and gel strength, and material(s) that reduce the filtration rate (Fluid Loss) of the completion fluid. The Rheology Modifier has been found to effectively increase the viscosity/gels and reduce the Fluid Loss of aqueous completion fluids over a wide range of conditions and brine (electrolyte) types.

Accordingly, in a particular embodiment of the present invention there is provided a method of completing a wellbore that penetrates through a porous and permeable subterranean rock formation comprising:

mixing a completion fluid comprising an aqueous base fluid, weight material (a salt and/or insoluble particulate weight material), and between 0.5 g/l and 24 g/l (0.175 ppb and 8.4 ppb) of the Rheology Modifier; pumping said completion fluid into the wellbore so that the formation fluid pressure and/or losses of completion fluid to the formation are controlled; performing the operations required to complete the well (such as perforating the casing, under-reaming (widening the wellbore diameter), fracturing the formation, placing gravel packs for the purpose of sand-control, installing sand screens, installing production tubing and packers); displacing completion fluid from the production tubing; allowing production to commence or injection to begin.

Similarly, in another embodiment of the present invention there is provided a method of working over a wellbore that penetrates through a porous and permeable subterranean rock formation comprising:

mixing a workover fluid comprising an aqueous base fluid, a weight material, and between 0.5 g/l and 24 g/l (0.175 ppb and 8.4 ppb) of the Rheology Modifier; pumping said workover fluid into the wellbore so that the completed interval and the production tubing is at least partly filled with said workover fluid and the formation fluid pressure is controlled; performing the operations required to repair the well (such as removing the production tubing, milling out the packer, sealing intervals that delivered unwanted high water-cut, re-perforating, fracturing the formation, placing gravel packs and or sand screens for the purpose of sand-control, installing new production tubing and packers); displacing workover fluid from the production tubing; allowing production to commence or injection to begin.

Fracturing fluids generally comprise a proppant (for example, sand particles or ceramic beads) suspended in an aqueous base fluid that is normally viscosified by a polymer or a viscoelastic surfactant such that the proppant that is used to prop open the fractures is efficiently transported into the fractures that are created when the fracturing fluid is pumped at high pressure into a rock formation. However, if the fracturing fluid leaks off too quickly into the formation the high pressure dissipates and the fractures cease to grow. Leak-off control is normally achieved by dispersing ground particles such as silica flour in the fracturing fluid to block/bridge the exposed pores in the fracture that are accepting the "leak-off", combined with the filtration-rate reducing effects of the dissolved polymer or viscoelastic surfactant. Solutions of the Rheology Modifier exhibit excellent particle suspension and filtration reduction characteristics that make them well suited for application in fracturing fluids.

Accordingly, in another embodiment of the present invention there is provided a method of fracturing a rock formation comprising:

injecting a fracturing fluid into an interval of a wellbore across the rock formation that is to be fractured wherein the fracturing fluid comprises an aqueous base fluid, proppant, the Rheology Modifier at a dose of between about 0.5 g/l (about 4 lbs per 1,000 US gallons) and about 6.25 g/l (about 50 lbs per 1,000 US gallons); and maintaining the pressure of the fracturing fluid at above the fracture pressure of the formation whereby the fractures grow and the Rheology Modifier solution assists the transport of the proppant particles along the fractures and reduces the rate of leak-off of the fluid into the rock formation.

Optionally the Rheology Modifier solution contains a cross-linking agent to boost the viscosity and gel strength.

Advantages of this embodiment of the present invention are that the pressure of the fracturing fluid in the growing fracture is maintained for as long as possible at above the fracturing pressure of the rock formation by reducing leak-off of fluid to the formation and hence reducing pressure dissipation to the formation, and that the transport of proppant evenly and deeply into the fractures is facilitated.

Even low concentrations of the Rheological Modifier effectively delay the onset of turbulent flow at high shear rates. Accordingly, in another embodiment of the present invention there is provided a method of fracturing ("slick-water fracturing") a rock formation comprising:

injecting a fracturing fluid into an interval of a wellbore across the rock formation that is to be fractured wherein the fracturing fluid comprises an aqueous base fluid, optionally a proppant, and the Rheology Modifier at a dose of between about 0.001 g/l (about 0.08 lbs per 1,000 US gallons) and about 0.5 g/l (about 4 lbs per 1,000 US gallons); and maintaining the pressure of the fracturing fluid at above the fracture pressure of the formation by pumping at a sufficiently high rate.

An advantage of this embodiment is that under the high rate pumping conditions the Rheology Modifier solution reduces the pressure losses and turbulence in the injection tubing and in the fractures, thereby promoting the extent of the growth of the fractures.

In both methods of fracturing as detailed above it is especially preferred to utilize the Rheology modifier in the form of either an Aqueous Dispersion Polymer or an Emulsion polymer suspended in an oleaginous liquid. This greatly facilitates the dosing and rapid, smooth dissolution of the polymer to give an essentially lump-free solution when employing in-line "on-the fly" dosing methods.

Aspects of the present application will be described in more detail by reference to the following non-limiting examples. Unless noted to the contrary, the polymers described in the following examples are terpolymers of AM/AMPS/Ageflex FA68 (mixture of hexadecyl acrylate and stearyl acrylate) prepared by dispersion polymerization.

Example 1

To Make Anionic Poly(AMPS) as Dispersant

To a 1 L 4-neck round bottom flask, equipped with water bath, thermal couple, mechanic stirrer and nitrogen inlet and outlet, was added 85 g 2-acrylamido-2-methyl propanesulfonic acid (AMPS acid), and 517 g deionized water, the mixture was purged with N2 at 40° C. for 30 min, 0.1758 g Ammonium Persulfate dissolved in 20 g deionized water was added in batches within 1 hour. The reaction was maintained for 19 hrs at 40° C. to obtain viscous poly (AMPS). A 13.7% by weight actives solution of polyacrylamidomethylpropane sulfonic acid was recovered. The polymer had a Mw of 2,680,000-3,450,000 by GPC.

Example 2

To Make AM/AMPS Copolymer by Dispersion Polymerization

To a 1 L resin reactor, equipped with water bath, thermal couple, mechanic stirrer and nitrogen inlet and outlet, was added 10.60 g NaOH dissolved into 56.17 g deionized water. 54.25 g AMPS acid was slowly added into the reactor and control the temperature below 30~40° C. After AMPS acid was completely dissolved, 39.97 g acrylamide (+98%), 250 g deionized water, 53.42 g of 12.3% solution of polyacrylamidomethylpropane sulfonic acid having been prepared in a manner similar to example 1 with a Mn of 280,000, Mw of 2,700,000 were added into the reactor, 50% NaOH was dropwise added to the above solution to adjust the pH value to 9 (in the range of 7-9). 125 g ammonium sulfate was added in the mixture. The above mixture was heated to 40° C. and purged with nitrogen for 30 minutes. 0.2095 g ammonium persulfate was dissolved in 20 g DIW and dropwise added into reactor within 90 minutes. Polymerization begins after 20 minutes and the solution become viscous. After 30 minutes the mixture became a milky dispersion. The reaction was continued for a total of 21 hours, during which time the temperature was maintained at 39-42° C. The resulting polymer dispersion was poured into an aluminum pan and dried in the oven at 110° C. for 3-4 hours to obtain the dry polymer cake that is further grinded into powder by a blender.

Example 3

To Prepare AM/AMPS/Alkyl Acrylate by Dispersion Polymerization

To a 1 L resin reactor, equipped with water bath, thermal couple, mechanic stirrer and nitrogen inlet and outlet, was added 10.75 g NaOH dissolved into 56.12 g deionized water. 54.27 g AMPS acid was slowly added into the reactor and control the temperature below 30~40° C. After AMPS acid was completely dissolved, 40.66 acrylamide (+98%), 300 g deionized water, 61.61 g of 13.7% solution of polyacrylamidomethylpropane sulfonic acid having been prepared in a manner similar to example 1 with a Mn of 522,000, Mw of 3,500,000 were added into the reactor, 50% NaOH was dropwise added to the above solution to adjust the pH value to 9 (in the range of 7-9). 135.63 g ammonium sulfate and 2.03 g Ageflex FA68 (mixture of hexadecyl acrylate and stearyl acrylate) was added in the mixture. The above mixture was heated to 40° C. and purged with nitrogen for 30 minutes. 0.1975 g ammonium persulfate was dissolved in 20 g DIW and dropwise added into reactor within 90 minutes. Polymerization begins after 20 minutes and the solution become viscous. After 30 minutes the mixture became a milky dispersion. The reaction was continued for a total of 21 hours, during which time the temperature was maintained at 39-42° C. The resulting polymer dispersion was poured into an aluminum pan and dried in the oven at 110° C. for 3-4 hours to obtain the dry polymer cake that is further grinded into powder by a blender.

Table below shows excellent thickening efficiency of ACM/AMPS/Stearyl Acrylate polymers prepared using the dispersion polymerization procedure described above.

| Sample ID | 1% Brookfield viscosity in water (@ 20 rpm/ 23° C.), cps | 1% Brookfield viscosity in Saturated NaCl (@ 20 rpm/23° C.), cps |
|---|---|---|
| 12086-43 | 1700 | 1000 |
| 12086-44 | 1700 | 1000 |
| 12086-46 | 1680 | 1200 |
| IRS 5543 | 900 | 690 |
| IRS 5603 | 1000 | 570 |
| IRS 5619 | 1170 | 630 |
| IRS 5631 | 950 | 505 |
| IRS 5632 | 1045 | 485 |

*Brookfield viscosities were measured on a conventional RV or LV Brookfield viscometer.

Example 4

Polymers obtained from Examples 2 and 3 were made to 1% solution in saturated NaCl, aged in the oven at 325° F.

Figure 2:
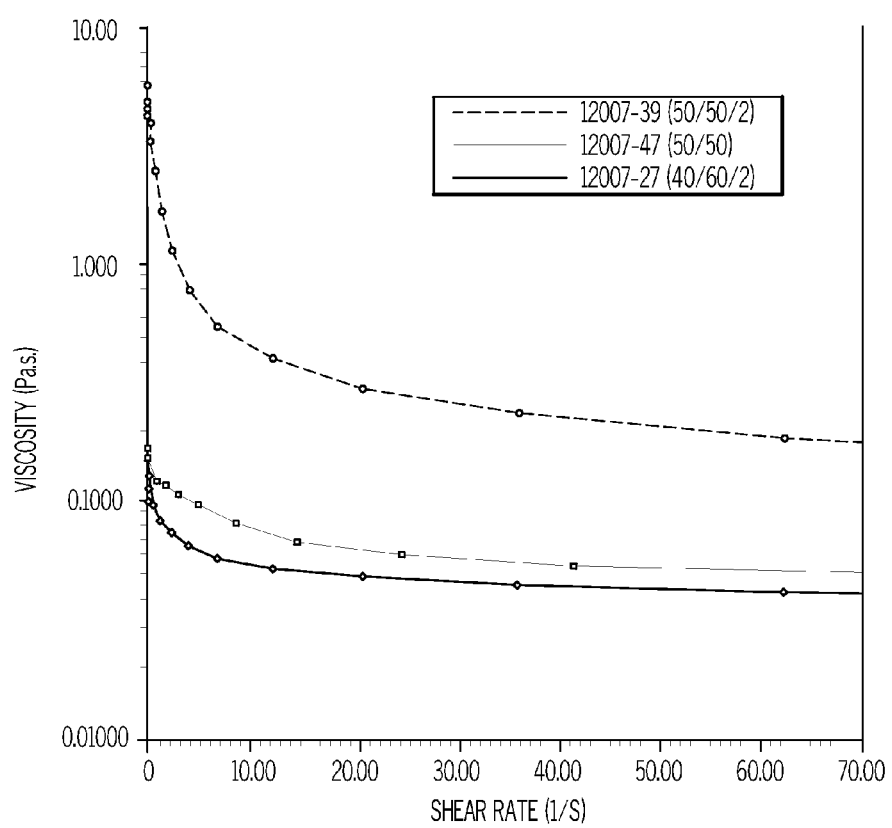
FIG. 2 illustrates the rheological profiles of various 1% polymer (actives wt.) in saturated NaCl solutions after aging (163° C. (325° F.) for 16 hours); Data were obtained on an Advanced Rheometer using a shear rate ramp procedure.
Figure 3:
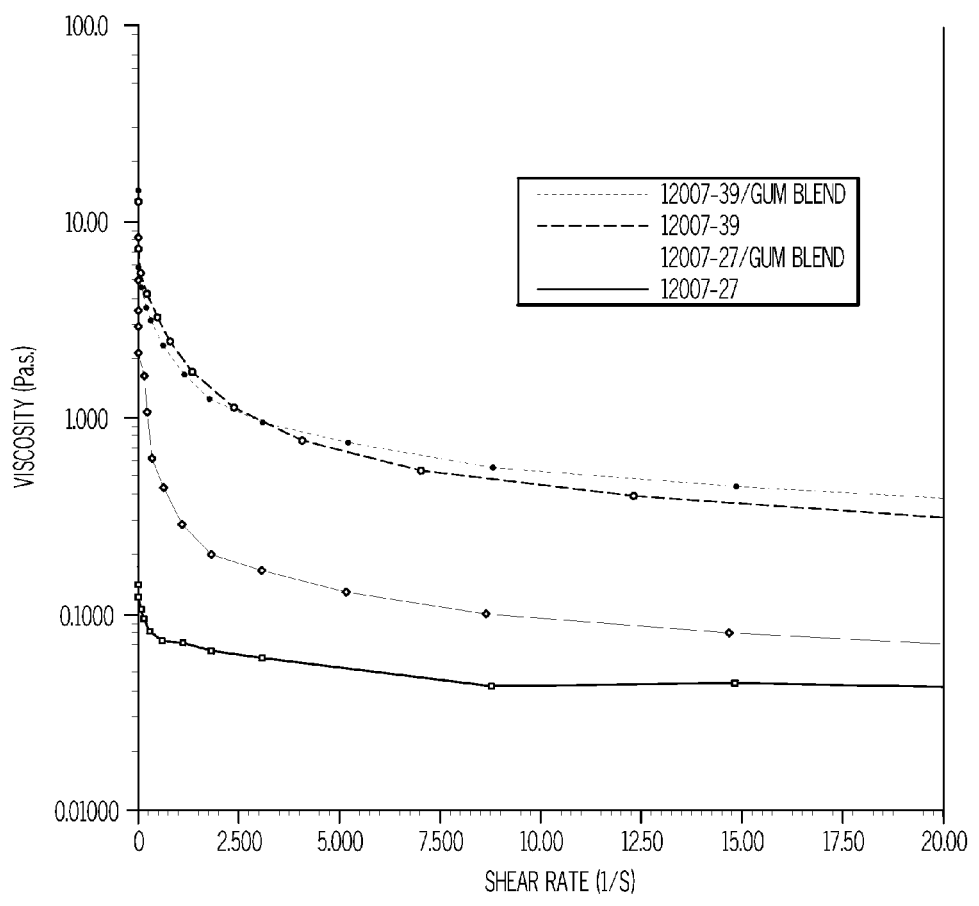
FIG. 3 illustrates the rheological profiles of various 1% polymer and polymer blends (0.75% polymer and 0.25% gum) in saturated NaCl solutions after aging (163° C. (325° F.) for 16 hours); Data were obtained on an Advanced Rheometer using a shear rate ramp procedure.
Figure 4:
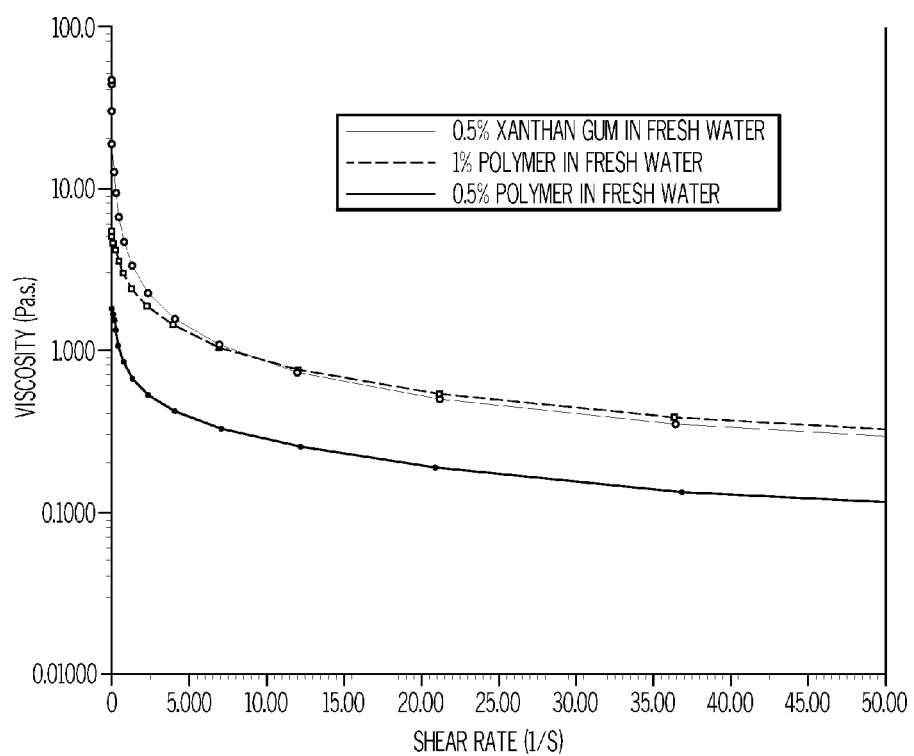
FIG. 4 illustrates the rheological profiles comparing the disclosed Rheology Modifier and compared with Xanthan gum in fresh water; Data were obtained on an Advanced Rheometer using a shear rate ramp procedure.
Figure 5:
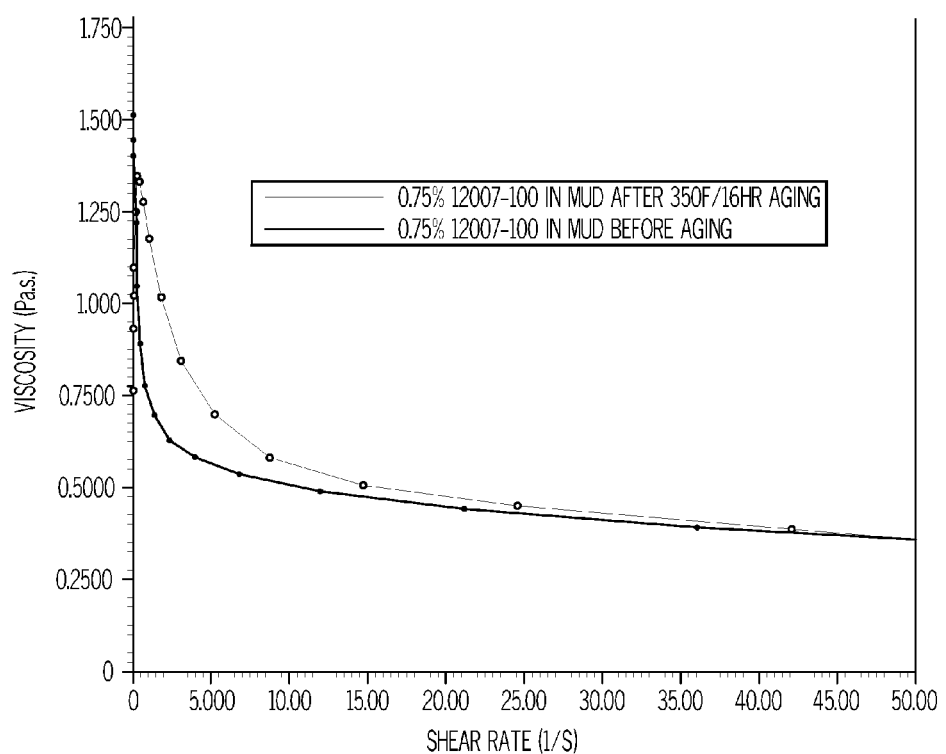
FIG. 5 illustrates the rheological profile of a sample containing 0.75% polymer in a model water-based drilling mud before and after aging (350° F. for 16 hours); Data were obtained on an Advanced Rheometer using a shear rate ramp procedure.

(163° C.) for 16 hours, and their viscosities were measured by AR G2 advanced rheometer and the results are shown in FIGS. 1-3. FIG. 1 shows that all the polymers have similar rheological profiles before aging. At low shear thinning rate (0.01-1 s−1), all polymer solutions are of high viscosity; when shear rate increases, the polymer solution viscosity decreases, indicating the typical shear thinning characteristics, i.e. viscosity decreases with shear rate increasing. If the polymer solution in fresh water or brine shows Newtonian behavior, (viscosity is a constant, does not change with shear rate), it is not of interest. After aging, the polymer solution in brine maintains viscosity and shows shear thinning, this is considered as passing the screen tests.

TABLE 1

Representative mud formulation used in aging test:

| Chemical Name | CAS# | SG | g | Mixing Order |
|---|---|---|---|---|
| F water | 7732-18-5 | 1.000 | 260.00 | |
| Soda Ash | 497-19-8 | 2.500 | 0.53 | 1 |
| NaCl | 7647-14-5 | 2.390 | 49.00 | 2 |
| RM Polymer or gum or blend | unknown | | * | 3 |
| Cellulosic Fluid Loss Additive | unknown | 1.600 | 2.00 | 4 |
| Modified Starch Fluid Loss Additive | unknown | 1.600 | 4.99 | 5 |
| API Barite | 7727-43-7 | 4.200 | 187.25 | 6 |
| Lubricant | unknown | 1.040 | 10.92 | 7 |
| Total | | | 525.19 | |

*Note:
The polymer dosage levels are adjusted to account for the levels of active rheology modifier in the polymer composition which may be in solid form or in the form of a dispersion. Polymer thickener solids usage level was evaluated from 0.1-1% based on total formulation weight. The rheology modifiers (RM polymer or gum or blend) were added into the formulation after NaCl and mixed to fully hydrate. Each of the components in the formulation were mixed to fully hydrated state.

The effect of the present invention was examined in a water based drilling fluid formulation similar to that provided in Table 1. OFITE Aging Cells are patented pressure vessels that enable samples to be subjected to temperatures higher than the boiling point of water and still be maintained in a liquid state. The cells may be used for static temperature exposure or in a dynamic mode in a roller oven with a normal minimum aging time of 16 hours. The mud formulations described herein were aged in 500 ml OFITE 303 grade stainless cells sealed with Teflon liner and O-rings in a OFITE roller oven.

The measured specifications of the fluid are outlined in Table 2. Plastic viscosity (PV), Yield Point (YP) and Gel Strength are measured on an oilfield type rotational viscometer Fann 35 (Data from Table 2 were measured on an Ofite viscometer). PV is a measure of the high-shear-rate viscosity of the fluid and is calculated from the measurements at 600 and 300 rpm rotational speeds and is equal to PV=θ600-θ300 cps. YP is a measure of the yield stress of the fluid and is calculated from YP=2 θ300-θ600 lb/100 ft2. The unit lb/100 ft2 is an oilfield unit, which is equivalent to 0.48 Pa.

Gel strength is the ability of fluid to suspend mud while mud is in static condition. Gel strengths can be measured by first stirring the sample thoroughly at 600 rpm on a Fann 35 viscometer. Subsequently set gears to the neutral position and turn motor off. After desired wait period (10 seconds or 10 minutes), turn gel knob, which is located below gear shift knob, slowly counterwise and read the dial at instant of the gel break. The reading is reported in 100 ft$^2$.

Gel strength should be just high enough to suspend weighing agents and drilling cuttings when circulation is stopped. Higher gel strengths are undesirable because they retard the separation of cuttings and of entrained gas at the surface, and also because they raise the pressure required to re-establish circulation after changing bits.

FIGS. 1-5 showe rheological properties of the RM polymer in fresh water, in brine solutions and in formulated drilling fluids with excellent thickening and shear thinning behavior before and after thermal aging.

After mud formulations were aged at a certain temperature, and their PV, YP, gel strength were still maintained >40% of their original values, they are considered as passing the tests. In accordance with certain embodiments, these values may be maintained at values that are at least 60%, 80% or even 90% of the original values for one or more of the specified tests.

TABLE 2

Mud properties* containing 1% polymer before and after aging:

| Sample | | Before Aging 0.5% Xanthan Gum (comparative) | After Aging @325 F. solids settling | Before Aging 1% polymer (AM/AMPS: 40/60/) (comparative) | After Aging @325 F. 1% polymer (AM/AMPS: 40/60/) (comparative) | Before Aging 1% polymer (AM/AMPS/FA68: 40/60/2) (batch 12007-61) | After Aging @325 F. 1% polymer (AM/AMPS/FA68: 40/60/2) (batch 12007-61) | Before Aging 1% polymer (AM/AMPS/FA68: 40/40/2) (batch 12007-63) | After Aging @325 F. 1% polymer (AM/AMPS/FA68: 40/40/2) (batch 12007-63) |
|---|---|---|---|---|---|---|---|---|---|
| Plastic viscosity* | cP | 76 | solids settling | 105.9 | 72.8 | 111.6 | 118.1 | 119.2 | 101.8 |
| Yield Point* | lb/100 ft$^2$ | 155 | too quickly to measure | 87.3 | 28.1 | 106.8 | 46.5 | 131.7 | 76.3 |
| 10 sec gel strength* | lb/100 ft$^2$ | 44.3 | | 4.8 | 1.1 | 6 | 3.5 | 7.2 | 4.2 |
| 10 min gel strength* | lb/100 ft$^2$ | 55.3 | | 7.5 | 1.2 | 8.6 | 4.5 | 10.5 | 5.2 |

*: Measured on a OFITE 900 viscometer. FA 68 is a commercial grade Stearyl Acrylate.

TABLE 3

GPC Molecular Weight Characterizations of the RM Polymers:

| Samples | Mw | Mn | PDI |
|---|---|---|---|
| (AM/AMPS/hydrophobe) (50/50/1) | 7,120,000 | 1,050,000 | 6.8 |
| 12007-90 (50/50/1) | 7,800,000 | 1,180,000 | 6.6 |
| 12007-92 (50/50/1) | 9,090,000 | 1,260,000 | 7.2 |
| 12007-93 (50/50/2) | 8,970,000 | 1,130,000 | 8.0 |

TABLE 4

Mud formulation containing 1% polymer before and after aging @ 350 F./16 hr:

| | 12007-84 (50/50/2) | | | 12007-85 (50/50/2) | | |
|---|---|---|---|---|---|---|
| Sample | Before aging | After aging | Ret. (%) | Before aging | After aging | Ret. (%) |
| PV (cps) | 91 | 50 | 55 | Too viscous | 51 | n/a |
| YP (lb/100 ft$^2$) | 109 | 85 | 78 | Too viscous | 94 | n/a |
| 10 sec (lb/100 ft$^2$) | 17 | 14 | 82 | 16 | 14 | 87 |
| 10 min (lb/100 ft$^2$) | 24 | 21 | 97 | 19 | 15 | 79 |

-Measured on a OFITE 900 viscometer

TABLE 5

Mud formulation containing 0.75% polymer before and after aged @ 350 F./16 hr:

| | 12007-47 (50/50) | | | 12007-100 (50/50/2) | | | 12007-103 (50/50/2) | | | 12007-98 (50/50/2) | | |
|---|---|---|---|---|---|---|---|---|---|---|---|---|
| Sample | Before aging | After aging | Ret. (%) | Before Aging | After aging | Ret. (%) | Before Aging | After aging | Ret. (%) | Before Aging | After aging | Ret. (%) |
| PV (cps)* | 69 | 25 | 36 | 55 | 38 | 69 | 55 | 24 | 44 | 56 | 22 | 39 |
| YP * (lb/100 ft$^2$) | 54 | 24 | 44 | 89 | 60 | 67 | 81 | 46 | 57 | 81 | 47 | 58 |
| 10 sec gel strength*(lb/100 ft$^2$) | 17 | 8 | 47 | 21 | 31 | 100* | 23 | 14 | 61 | 14 | 10 | 71 |
| 10 min gel strength * (lb/100 ft$^2$) | 16 | 6 | 37 | 26 | 24 | 92 | 24 | 22 | 92 | 21 | 11 | 52 |

*Measured on a Fann 35 viscometer.

TABLE 6

The following table provides mud aging results for AM/AMPS/alkyl acrylate dispersion samples:

| | | Screening Test method: 1% polymer in Saturated NaCl | | | | |
|---|---|---|---|---|---|---|
| AM/AMPS wt ratio | % stearyl acrylate (based on total of monomer) | Thickening efficiency before aging | Rheology before aging | Aging test at @325 F./16 hr | Mud formulation aging test 325 F./16 hr | Mud formulation aging test 350 F./16 hr |
| 25/75 | 1 | moderate | N/A | failed | N/A | N/A |
| 25/75 | 2 | moderate | N/A | failed | N/A | N/A |
| 25/75 | 3 | moderate | N/A | failed | N/A | N/A |
| 30/70 | 1 | good | N/A | failed | N/A | N/A |
| 30/70 | 2 | good | N/A | failed | N/A | N/A |
| 30/70 | 3 | good | N/A | failed | N/A | N/A |
| 40/60 | 0 | excellent | N/A | N/A | Retention of viscosity | N/A |
| 40/60 | 1 | excellent | N/A | N/A | excellent retention viscosity | N/A |
| 40/60 | 2 | excellent | Great Shear thinning before aging | passed | excellent retention of viscosity | N/A |

TABLE 6-continued

The following table provides mud aging results for AM/AMPS/alkyl acrylate dispersion samples:

| AM/AMPS wt ratio | % stearyl acrylate (based on total of monomer) | Screening Test method: 1% polymer in Saturated NaCl | | | Mud formulation aging test | |
|---|---|---|---|---|---|---|
| | | Thickening efficiency before aging | Rheology before aging | Aging test at @325 F./16 hr | 325 F./16 hr | 350 F./16 hr |
| 50/50 | 0 | excellent | Great Shear thinning before aging | N/A | N/A | Good retention of viscosity |
| 50/50 | 1 | excellent | Great shear thinning before aging | N/A | N/A | Excellent retention of viscosity, some shear thinning retention |
| 50/50 | 2 | excellent | Great Shear thinning before aging | passed | N/A | Excellent retention of viscosity, some shear thinning retention |
| 60/40 | 1 | N/A | N/A | N/A | N/A | Low retention of viscosity |
| 60/40 | 2.65 | N/A | N/A | N/A | N/A | Low retention of viscosity |
| 70/30 | 1.2 | N/A | N/A | N/A | N/A | Retention of viscosity |
| 70/30 | 2.8 | N/A | N/A | N/A | N/A | Retention of viscosity |
| 70/30 | LA*: 2.3 | N/A | N/A | N/A | N/A | Good retention of viscosity |
| 60/40 | LA*: 2.2 | N/A | N/A | N/A | N/A | Retention of viscosity |
| 50/50 | LA*: 2.4 | N/A | N/A | N/A | N/A | Retention of viscosity |

*LA: lauryl acrylate
N/A—Not available
Examples without a hydrophobe are comparative.

Example 5

Water Based Drilling Muds Showing Viscosity Retention and Good Fluid Loss after Ageing Drilling fluid formulations containing either ACM/AMPS/Stearyl Acrylate Rheology Modifier or xanthan gum were compared in high temperature aging tests. BHR: Before Hot Rolling aging, AHR: After Hot Rolling aging.

A ~12.5 ppg drilling fluid formulation was made on a 600 g scale containing weighting agents, rheology modifier (ACM/AMPS/Stearyl Acrylate Rheology Modifier or xanthan gum), and fluid loss control additives as shown in following table. Sufficient mixing was required to facilitate dissolving of the polymer and avoid local viscosified agglomerates (fish eyes). The drilling fluids were allowed to agitate for 5-10 minutes between the addition of each component and with 60 minutes total for complete and homogenous mixing. Rheological properties were then measured on Fann 35 before and after hot rolling aging tests. The API fluid losses were measured based by API-RP-13B-1 standard.

TABLE 7

| Chemical Name | g |
|---|---|
| Fresh water | QS to 600 g total |
| KCl | 57 |
| Viscosifier (ACM/AMPS/Stearyl Acrylate Rheology Modifier or xanthan gum) | 6 |
| PAC | 2.3 |
| 50% NaOH to pH 10-10.5 | Variable |
| Baroid 41Barite | 215 |
| Total | 600 |

The Rheological properties and Fluid Loss results BHR and AHR are shown in the following table:

TABLE 8

Aging results of muds based on the RM polymer or xanthan gum

| Fann 35 data 310 F./16 hr aging | ACM/AMPS/Stearyl Acrylate Rheology Modifier | | Xanthan gum | |
|---|---|---|---|---|
| | BHR | AHR | BHR | AHR |
| 3 rpm | 24 | 6 | 25 | 2 |
| 6 rpm | 35 | 9 | 39 | 2.5 |
| 100 rpm | 109 | 61 | 134 | 5 |
| 200 rpm | 155 | 94 | 160 | 8 |
| 300 rpm | 188 | 121 | 181 | 11 |
| 600 rpm | 263 | 180 | 228 | 23 |
| PV (cps) | 75 | 59 | 47 | 12 |
| YP (lb/100 ft²) | 113 | 62 | 134 | 11 |

TABLE 8-continued

Aging results of muds based on the RM polymer or xanthan gum

| Fann 35 data | ACM/AMPS/Stearyl Acrylate Rheology Modifier | | Xanthan gum | |
|---|---|---|---|---|
| 310 F./16 hr aging | BHR | AHR | BHR | AHR |
| 10 sec gel strength (lb/100 ft$^2$) | 107 | 61 | 108 | 5 |
| 10 min gel strength (lb/100 ft$^2$) | 111 | 64 | 120 | 6 |
| API Fluid loss (mL/30 min) | N/A | 1.8 | N/A | 158 mL/10 min |

The water based drilling mud formulated with ACM/AMP S/Stearyl Acrylate Rheology Modifier showed good viscosity retention and excellent Fluid Loss control after hot rolling, whereas the Xanthan gum fluid did not. ACM/AMPS/Stearyl Acrylate Rheology Modifier is thus well suited as a drilling fluid additive, especially where the downhole temperatures exceed those at which xanthan gum undergoes rapid degradation.

Example 6

Comparison of the Thermal Stability of Simple Solutions of ACM/AMPS/Stearyl Acrylate Rheology Modifier and Xanthan 1 liter of each fluid was made based on the following formulation table. The formulations used doses of viscosifying polymer (xanthan gum or ACM/AMP S/Stearyl Acrylate Rheology Modifier) such that each fluid exhibited approximately the same Yield Point before hot rolling.

TABLE 9

| | Wt (g) | Wt(g) |
|---|---|---|
| De-ionized water | 942 | 900 |
| NaCl | 129 | 129 |
| Xanthan gum | 8 | — |
| ACM/AMPS/Stearyl Acrylate Rheology Modifier, 20% actives | — | 80 |
| Caustic soda dropwise to adjust PH 9.5 | | |

The solutions were made with a high speed mixer. Rheological properties were then measured on Fann 35 before and after hot rolling aging tests, first at 250° F. as shown in the next table.

TABLE 10

| Fann 35 data | ACM/AMPS/Stearyl Acrylate Rheology Modifier | | Xanthan gum | |
|---|---|---|---|---|
| 250 F./16 hr aging | BHR | AHR | BHR | AHR |
| 3 rpm | 6 | 1 | 24 | 0 |
| 6 rpm | 10 | 2 | 26 | 1 |
| 100 rpm | 46 | 9 | 39 | 2 |
| 200 rpm | 66 | 31 | 47 | 4 |
| 300 rpm | 82 | 42 | 52 | 6 |
| 600 rpm | 121 | 67 | 64 | 10 |
| PV (cps) | 39 | 25 | 12 | 4 |
| YP (lb/100 ft$^2$) | 43 | 17 | 40 | 2 |

TABLE 10-continued

| Fann 35 data | ACM/AMPS/Stearyl Acrylate Rheology Modifier | | Xanthan gum | |
|---|---|---|---|---|
| 250 F./16 hr aging | BHR | AHR | BHR | AHR |
| 10 sec gel strength (lb/100 ft$^2$) | 35 | 12 | 40 | 2 |
| 10 min gel strength (lb/100 ft$^2$) | 40 | 14 | 40 | 2 |

The results in the above table clearly show that the formulation using ACM/AMPS/Stearyl Acrylate Rheology Modifier exhibited much less reduction in rheological properties after hot rolling than the xanthan gum formulation.

Another sample of each of the two fluids was the hot rolled at 300° F., the rheological properties before and after hot rolling are shown in the next Table.

TABLE 11

| Fann 35 data | ACM/AMPS/Stearyl Acrylate Rheology Modifier | | Xanthan gum | |
|---|---|---|---|---|
| 300 F./16 hr aging | BHR | AHR | BHR | AHR |
| 3 rpm | 13 | 2 | 24 | 0 |
| 6 rpm | 17 | 3 | 26 | 0 |
| 100 rpm | 53 | 9 | 39 | 2 |
| 200 rpm | 74 | 15 | 47 | 2 |
| 300 rpm | 92 | 21 | 52 | 2 |
| 600 rpm | 135 | 37 | 64 | 4 |
| PV (cps) | 43 | 16 | 12 | 2 |
| YP (lb/100 ft$^2$) | 49 | 5 | 40 | 0 |
| 10 sec gel strength (lb/100 ft$^2$) | 58 | 9 | 40 | 0 |
| 10 min gel strength (lb/100 ft$^2$) | 66 | 11 | 40 | 0 |

After exposure to hot rolling at 300° F., the viscosifying effects of xanthan gum are essentially diminished. The fluid using ACM/AMPS/Stearyl Acrylate Rheology Modifier exhibited a useful degree of retention of viscous properties.

Example 7

Synergy with PAC in Simple Brine Solution after Aging

Brine solutions containing ACM/AMPS/Stearyl Acrylate Rheology Modifier and PAC-L (fluid loss additive grade, Baroid Fluid Services) were made using the following formulation table. The solutions were made with a high speed mixer. Rheological properties were then measured on Fann 35 before and after hot rolling aging tests.

TABLE 12

| | Wt(g) | Wt (g) |
|---|---|---|
| De-ionized water | 900 | 900 |
| NaCl | 129 | 129 |
| ACM/AMPS/Stearyl Acrylate Rheology Modifier, 20% | 50 | 50 |
| PAC-L (Fluid loss additive grade, Baroid Fluid Services) | 0 | 1 |
| Caustic soda dropwise to adjust PH 9.5 | Variable to adjust PH | Variable to adjust PH |

TABLE 13

| Fann 35 | ACM/AMPS/Stearyl Acrylate Rheology Modifier alone 0.93% (300 F. aging) | | ACM/AMPS/Stearyl Acrylate Rheology RM polymer 0.93% + PAC (300 F. aging) | |
|---|---|---|---|---|
| data | BHR | AHR | BHR | AHR |
| 3 rpm | 2 | 0 | 5.5 | 3 |
| 6 rpm | 3 | 1 | 8 | 4 |
| 100 rpm | 20 | 2 | 29 | 11 |
| 200 rpm | 30 | 3 | 40 | 18 |
| 300 rpm | 39 | 4 | 48 | 23 |
| 600 rpm | 60 | 6 | 71 | 38 |
| PV (cps) | 21 | 3 | 23 | 15 |
| YP (lb/100 ft$^2$) | 18 | 1 | 25 | 7 |
| 10 s gel strength (lb/100 ft$^2$) | 17 | 1 | 30 | 10 |
| 10 m gel strength (lb/100 ft$^2$) | 17 | 1 | 34 | 13 |

The addition of PAC significantly improves the rheological properties of brine solutions before and after hot rolling tests respectively. There is a synergism between ACM/AMPS/Stearyl Acrylate Rheology Modifier and PAC material.

Example 8

Use in a Brine Loss Control Pill or Diverting Fluid 250 ml of each solution (ACM/AMPS/Stearyl Acrylate Rheology Modifier and xanthan gum) from example 5 was added 25 g BARACARB 25. The mixture was mixed well and API fluid loss was measured by API RP-13B-1 standard.

TABLE 14

| Time (min) | ACM/AMPS/Stearyl Acrylate Rheology Modifier in Brine solution, API filtrate volume(ml) | Xanthan gum in Brine solution, API filtrate volume(ml) |
|---|---|---|
| 1 | 0.8 | 1.0 |
| 2 | 1.2 | 1.3 |
| 5 | 1.8 | 2.0 |
| 10 | 2.2 | 2.8 |
| 15 | 2.4 | 3.6 |
| 20 | 2.8 | 4.3 |
| 25 | 3.2 | 4.8 |
| 30 | 3.4 | 5.3 |

Clearly the fluid containing ACM/AMPS/Stearyl Acrylate Rheology Modifier exhibits a very low API Fluid Loss. This, combined with the suspending ability for dispersed solids evidenced by the gel strengths shown in previous examples, shows that ACM/AMPS/Stearyl Acrylate Rheology Modifier is very suitable for use in brine loss control fluids or diverting fluids (diverting fluids are placed over a portion of a permeable formation to seal it so that subsequent fluids are diverted to, and injected into, other portions of the formation). By comparison, a simple mixture of 250 ml of brine plus 25 g of Baracarb 25 exhibited a total loss of the cell's contents in less than 30 seconds in the API Fluid Loss test.

Example 9

Use in a Fracturing Fluid

Two brine solutions containing ACM/AMPS/Stearyl Acrylate Rheology Modifier or Hydroxypropyl Guar (Jaguar HP-60) gum were made by the following formulation table. The solutions were poured into a 100 ml measuring cylinder, respectively. 3 individual Carbolite 16-20 proppant spheres were dropped into the fluid and the sedimentation rate was recorded by stop watch respectively.

TABLE 15

| Material | Weight (g) | Weight (g) |
|---|---|---|
| Deionized water | 325.3 | 325.3 |
| KCl | 3.33 | 3.33 |
| ACM/AMPS/STEARYL ACRYLATE RHEOLOGY MODIFIER, 20% | 16 | — |
| Jaguar HP-60 (Rhodia) | — | 3.2 |

Figure 6:
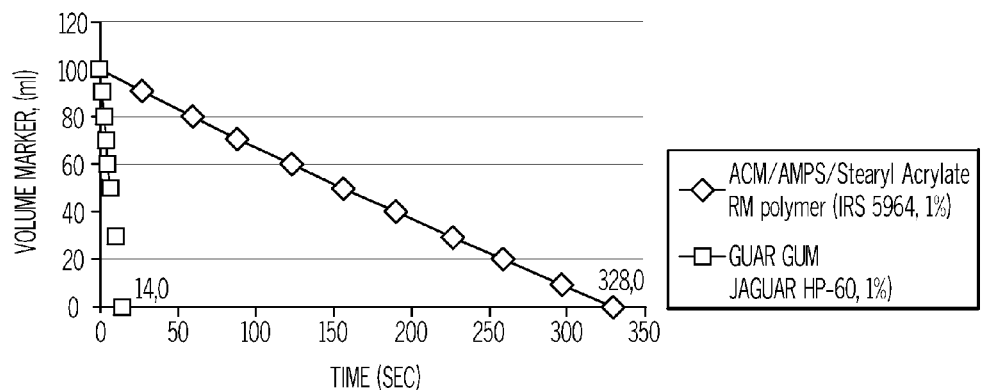
FIG. 6 is a graph showing the rate of proppant sedimentation for brine solutions containing guar gum compared to solutions containing the disclosed Rheology Modifier.

As shown in FIG. 6, clearly the proppant sedimentation rate with the ACM/AMPS/Stearyl Acrylate Rheology Modifier fluid is much lower than with the hydroxypropyl guar sample. HP guar is a commonly used Fracturing fluid additive. ACM/AMPS/Stearyl Acrylate Rheology Modifier is thus well-suited as a fracturing fluid additive for proppant transport.

Example 10

Ease and Speed of Mixing of Liquid Dispersion Polymer to Lump Free Solution 350 ml deionized water was mixed with 3.5 g KCl to make 1% w/v salt solution.

Fann 35 cup was running at 600 rpm with above salt solution, subsequently 17.5 g ACM/AMPS/Stearyl Acrylate Rheology Modifier was injected into the Fann 35 cup by a syringe. Their dial readings were recorded periodically. The test was performed at room temperature (20° C.)

TABLE 16

| Total time at 600 rpm | Dial reading | | | |
|---|---|---|---|---|
| | 3 rpm | 6 rpm | 300 rpm | 600 rpm |
| 2 | 1.5 | 2 | 22 | 34 |
| 5 | 3 | 4 | 40 | 60 |
| 10 | 5 | 7 | 55 | 79 |
| 20 | 6 | 9.5 | 68 | 97 |
| 40 | 7 | 10 | 74.5 | 106 |
| 80 | 7 | 10 | 74 | 106.5 |

Figure 7:
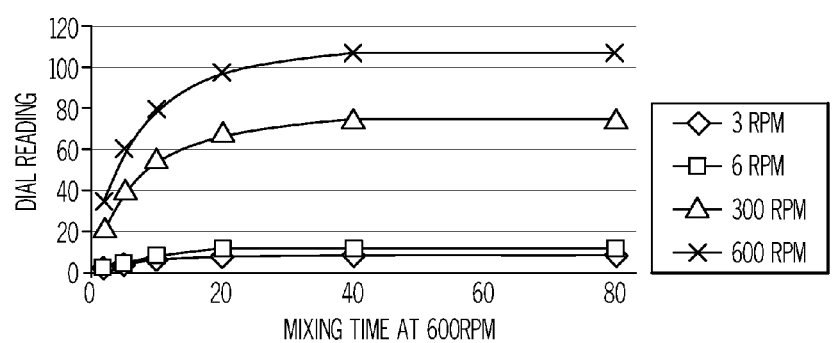
FIG. 7 illustrates thickening as a function of time for the disclosed Rheology Modifier in 1% NaCl brine solution (D.R.=Dial Reading using a Fann 35 viscometer, time in seconds)

As shown in FIG. 7, the fluid reached about 80% of its ultimate viscosity (600 rpm reading) in just over 10 minutes while mixing at a low shear rate (the solution is periodically exposed to a shear rate of 1012 reciprocal seconds when it is drawn into the gap between the rotor and the stator of the Fann 35 rheometer, the solution outside the rotor seeing a much lower shear rate). The solution after the test was passed through a 100 mesh (150 micron) screen. No lumps or "fish eyes" of semi-hydrated polymer were visible.

The ACM/AMPS/Stearyl Acrylate Rheology Modifier aqueous dispersion polymer (20% by weight active polymer) is thus well-suited to mixing "on the fly" into fracturing fluids, either for proppant transport or for the purpose of friction (turbulence) reduction (as described in subsequent Example 12).

Example 11

Figure 8:
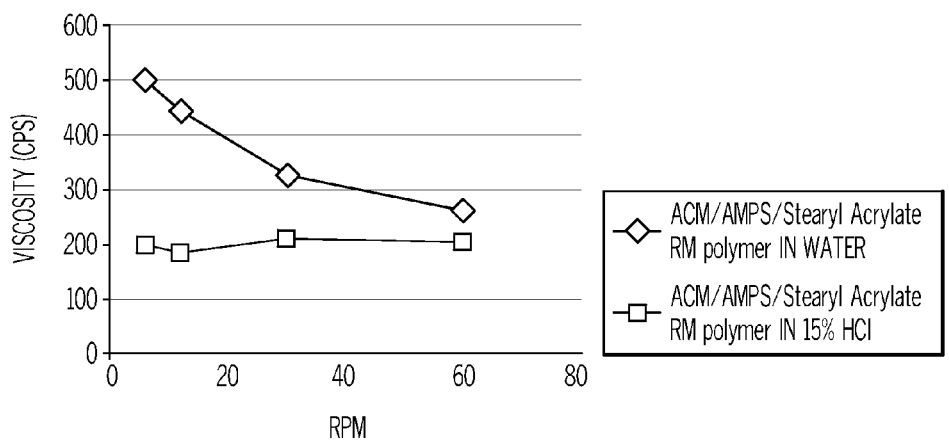
FIG. 8 illustrates the rheological profile of samples containing the disclosed Rheology Modifier (actives) (0.59% wt.) in water and in 15% HCl; Data were obtained on a conventional Brookfield viscometer.

Use as Acidizing Additive in 15% HCl 100 g concentrated HCl (37%) was carefully added into 146.7 g deionized water to make 246.7 g of 15% by weight HCl solution. 7.5 g of ACM/AMPS/Stearyl Acrylate Rheology Modifier (20%) was added into above 246.7 g 15% HCl solution and mixed until fully dissolved. Another 7.5 g of ACM/AMPS/Stearyl Acrylate Rheology Modifier was added to 246.7 g deionized water and mixed until fully dissolved. Their viscosities were measured using a conventional Brookfield viscometer and are shown in FIG. 8.

TABLE 17

| | | No HCl | | With 15% HCl | |
|---|---|---|---|---|---|
| rpm | Factor | D.R. | Viscosity, cps | D.R | Viscosity, cps |
| 6 | 50 | 10 | 500 | 4 | 200 |
| 12 | 25 | 18 | 450 | 7.5 | 188 |
| 30 | 10 | 33 | 330 | 21 | 210 |
| 60 | 5 | 53 | 265 | 41 | 205 |

Both solutions were obtained without precipitation. Although the ACM/AMPS/Stearyl Acrylate Rheology Modifier generates slightly lower viscosity in 15% HCl than in distilled water, clearly it effectively imparts viscosity to the acid to a degree that is useful for limiting the flow rate of the acid through porous and permeable rock formations.

Example 12

Use of ACM/AMPS/Stearyl Acrylate Rheology Modifier as a Friction Reducer

Friction Reduction Testing Apparatus

A 0.5% w/v polymer solution in deionized water was prepared. Required volume of above solution was added into a 600 ml of synthetic seawater and mixed under low shear until homogeneous. The polymer treated seawater solution was transferred to the test cell.

The inlet gas pressure was set to 10 psi using the pressure regulator and the inlet valve to the pressure cell was opened while the outlet value was in the closed position. The outlet valve was then opened and the time needed to eject 500 ml of the test brine was recorded. The outlet value was closed immediately once the test was complete. Subsequently the inlet valve was closed and the pressure in the cell was released. The pressure was always maintained at 10 psi throughout the test by adjusting the pressure regulator. The tests at 20 psi and 30 psi were repeated using the same test brine. The same procedure was repeated to test the untreated brine solution or treated brine solutions by ACM/AMPS/Stearyl Acrylate Rheology Modifier at different dosage levels. The friction factor was determined based on Reynolds Number of 15,000, and friction reduction % was calculated from the following equation.

$$\% \, DR = (f_s - f_p)/f_s \times 100$$

where fs and fp are the friction factors for the blank and polymer treated respectively.

Figure 9:
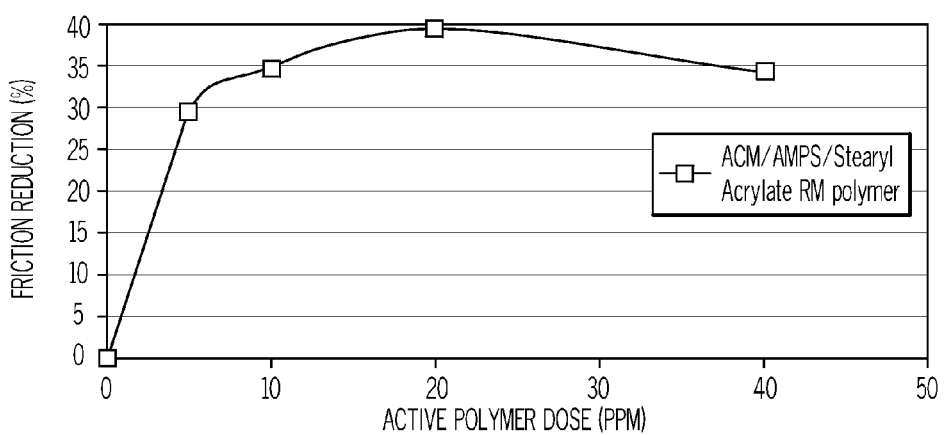
FIG. 9 provides a graphical representation of friction reduction as a function of active RM polymer dose for fully activated (pre-dissolved) solutions at Re=15000.

As shown in FIG. 9, a reduction in hydraulic friction of about 30% was achieved at a dose of ACM/AMPS/Stearyl Acrylate Rheology Modifier of only 5 ppm active polymer, and nearly 40% at 20 ppm. ACM/AMPS/Stearyl Acrylate Rheology Modifier ACM/AMPS/Stearyl Acrylate Rheology Modifier is thus well-suited for use as a friction reducer in many dynamic water-based systems including fire hoses, ship or submarine velocity-increasing applications, and in water-based fluids injected into wells. It is especially useful as a friction reducer in high rate fracturing fluids, especially low viscosity "slickwater" fracturing fluids.

Example 13

Use as a Cement Slurry Additive

Two API Class H cement slurries were prepared as described in the following table. Their rheological data were measured on Fann 35. Subsequently they were poured into a 200 mL measuring cylinders, respectively. Both slurries were allowed to stand and free water breakouts versus time were measured for both. (The Free Water is the clear, or near-clear, watery phase that migrates to the top of the cement slurry as it settles and compresses under its own weight). The set time of cement for both slurries were recorded too. The API fluid loss was measured by API-RP-13B-1 standard.

TABLE 18

| Material to make cement slurry | Weight (g) | Weight (g) |
|---|---|---|
| Fresh water | 155 | 155 |
| ACM/AMPS/Stearyl Acrylate Rheology Modifier (20% active) | 7.5 | — |
| Class H cement | 145 | 145 |

TABLE 19

| Fann 35 data | Base cement slurry without ACM/AMPS/STEARYL ACRYLATE RHEOLOGY MODIFIER | Base cement slurry with ACM/AMPS/STEARYL ACRYLATE RHEOLOGY MODIFIER |
|---|---|---|
| 3 rpm | 2.5 | 6 |
| 6 rpm | 3 | 10 |
| 100 rpm | 3.5 | 49 |
| 200 rpm | 4.5 | 65 |
| 300 rpm | 6 | 77 |
| 600 rpm | 12.5 | 106 |
| PV (cps) | 6.5 | 29 |
| YP (lb/100 ft$^2$) | 0 | 48 |
| 10 s gel strength (lb/100 ft$^2$) | 15 | 50 |
| 10 m gel strength (lb/100 ft$^2$) | 5 | 62 |

TABLE 20

| | Basic cement slurry | | ACM/AMPS/Stearyl Acrylate Rheology Modifier treated cement slurry | |
|---|---|---|---|---|
| Time | Elapsed time, min | Cement Solid vol ml | Free water vol, ml | Cement solid, ml | Free water vol, ml |
| 10:27 | 0 | 200 | 0 | 200 | 0 |
| 10:30 | 3 | 190 | 10 | 200 | 0 |
| 10:40 | 13 | 174 | 26 | 200 | 0 |
| 10:52 | 25 | 161 | 39 | 200 | 0 |
| 11:00 | 33 | 152 | 48 | 200 | 0 |

TABLE 20-continued

| | | Basic cement slurry | | ACM/AMPS/Stearyl Acrylate Rheology Modifier treated cement slurry | |
|---|---|---|---|---|---|
| Time | Elapsed time, min | Cement Solid vol ml | Free water vol, ml | Cement solid, ml | Free water vol, ml |
| 11:20 | 53 | 129 | 71 | 200 | 0 |
| 11:50 | 83 | 112 | 88 | 198 | 2 |
| 12:05 | 98 | 110 | 90 | 197 | 3 |
| 13:15 | 168 | 110 | 90 | 196 | 4 |
| 15:40 | 313 | 110 | 90 | 196 | 5 |
| Next day 7:00 am | 21 hrs | 110 | 90 | 194 | 6 |
| | | Cement firm set | | Cement soft set | |

TABLE 21

| Time (min) | Base cement slurry without ACM/AMPS/STEARYL ACRYLATE RHEOLOGY MODIFIER Filtrate volume (ml) | Base cement slurry with ACM/AMPS/STEARYL ACRYLATE RHEOLOGY MODIFIER Filtrate volume (ml) |
|---|---|---|
| 1 | 105 | 4 |
| 5 | 190 | 14 |
| 7.5 | 195 (no more fluid left in the cell) | 20.5 |
| 10 | — | 25 |
| 15 | — | 35 |
| 20 | — | 43 |
| 25 | — | 51 |
| 30 | — | 57 |

Because it is able to impart large reductions in Free Water and in API Fluid Loss to a cement slurry, ACM/AMPS/Stearyl Acrylate Rheology Modifier is well-suited for use as a cement additive.

Example 14

Comparison of Terpolymer Made Through Dispersion Polymerization Process Vs. Other Processes Recipe and procedure for liquid dispersion polymer (LDP) form ACM/AMPS/Stearyl Acrylate terpolymer

| Recipe | |
|---|---|
| | wt (g) |
| Aqueous phase | |
| Acrylamide 50% | 199 |
| AMPS | 99.5 |
| DPTA | 0.7 |
| Sodium Hydroxide (50%) | 43.7 |
| Water | 32.6 |
| Stearyl acrylate | 4 |
| Oil Phase | |
| 20% Amphipathic polymeric stabiliser in oil | 33 |
| Span 80 | 6.2 |
| Isopar G | 177.5 |
| Initiators | |
| SMBS | 1.0 g |
| Water | 99.0 g |
| Span 80 | 4.0 g |
| Isopar G | 76.0 g |
| tBHP | 0.21 g |
| Isopar G | 29.79 g |
| Post polymerisation oil | |
| SN 150 | 153.7 |

Activator

1% on weight of total finished product of a 75/25 blend of Synperonic A7L and Crodafos T5

Procedure

1. Silverson aqueous and oil phase for 2.5 mins and transfer to a glass reactor with stirring
2. Degas for 90 mins
3. Insulate reactor and start initiator feeds to control the heat rise observed to 1° C. per minute
4. Once top temperature has been reached remove insulation and add oil
5. Distill to remove Isopar and water
6. Add activator to the distilled product and test Recipe and procedure for solid form (Gel polymerization)

Gel Polymerisation Recipe (30% Solids)

| Reactor charge (40° C.) | |
|---|---|
| Acrylamide (50%) | 92.55 g |
| AMPS | 41.85 g |
| Stearyl Acrylate | 1.8 g |
| DPTA | 0.09 g |
| Water | 147.69 g |
| V50 | 0.018 g (200 ppm) |
| Neutralization (pH 7) | |
| Sodium Hydroxide (50%) | 16.11 g |

| | | 1 | | 2 | | 3 | | 4 | |
|---|---|---|---|---|---|---|---|---|---|
| Initiators | | Level (ppm) | Weight (g) | Level (ppm) | Weight (g) | Level (ppm) | Weight (g) | Level (ppm) | Weight (g) |
| FAS | | 1.8 | 0.000162 | 3.6 | 0.000324 | 5.4 | 0.000486 | 9 | 0.00081 |
| APS | | 90 | 0.0081 | 180 | 0.0162 | 270 | 0.0243 | 450 | 0.0405 |

Initiators were made up as either 1, 0.1 or 0.01% solutions where appropriate for the weight required. The weight of water used was removed from the reactor charge to keep the solids at 30% for all batches.

Procedure
1. Add reactor charge to a glass reactor with stirring and neutralise to pH 6.8-7.2.
2. Degas the contents with nitrogen while heating to 41-42° C. in a water bath
3. Transfer contents of reactor to an insulted flask and continue to degas until temperature drops to 40° C.
4. Add initiators as a shot
5. Stir reactor contents five times with the nitrogen bubbler then remove
6. Attach lid with thermometer to seal the reactor flask
7. Record the temperature rise over time
8. Once top temperature has been reached allow to cool in flask over night
9. Remove gel and cut into small pieces
10. Place small pieces of gel on a metal tray and dry in a 60° C. oven
11. Grind the dried gel into a fine powder to produce the finished product Performance Comparison
LDP process vs. Dispersion Polymerization

|  | 1% polymer in fresh water | 1% Polymer in 10% KCl |
| --- | --- | --- |
| IRS 3800A | 2670 cps | 210 cps |
| IRS 3800B | 2470 cps | 114 cps |

Figure 10:
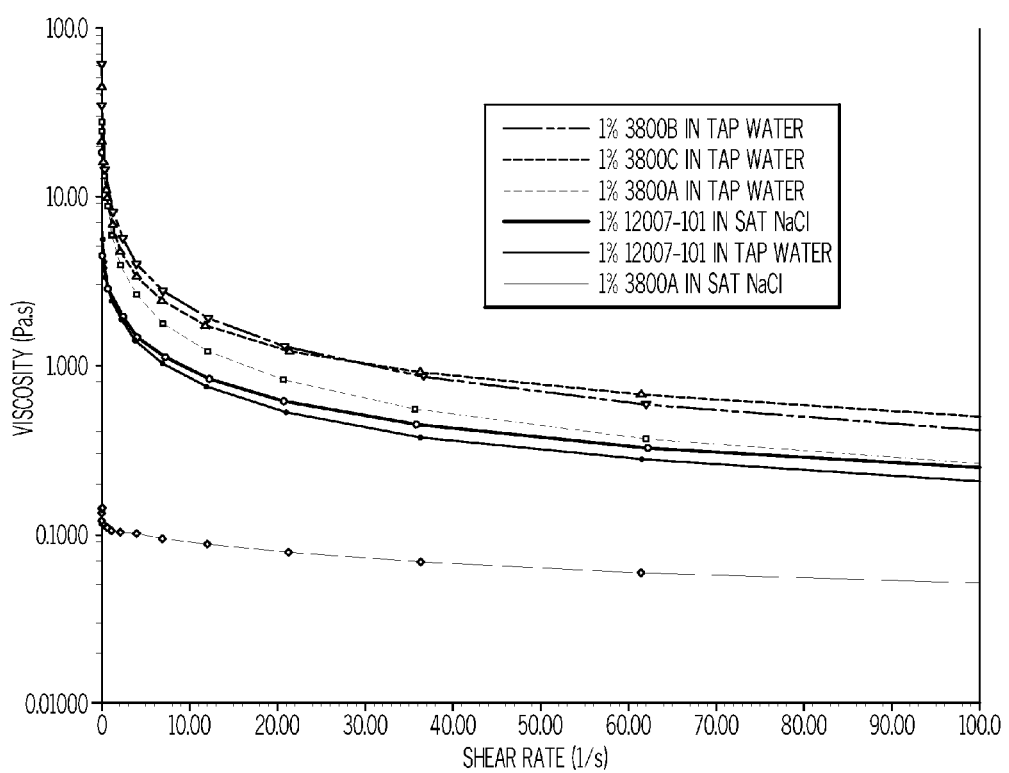
FIG. 10 illustrates the rheological profile of samples of ACM/AMPS Stearyl Acrylate polymers made through the Liquid Dispersion Polymerization (LDP) process compared to Rheology Modifier made through the dispersion polymerization process described herein. Samples 12007-101 was made by the dispersion polymerization process; Samples 3800A, B and C were made through the LDP process. Data were obtained on an Advanced Rheometer using a shear rate ramp procedure.

ACM/AMPS/Stearyl Acrylate polymers made through the LDP process showed excellent thickening in fresh water, but much inferior viscosity in brine solutions, making it not suitable for typical oilfield applications in the presence of brines. As provided in FIG. 10, ACM/AMPS Stearyl Acrylate polymers made through the LDP process exhibited poor salt tolerance. 12007-101 is ACM/AMPS/Stearyl Acrylate polymer made through the dispersion polymerization process showing excellent thickening and salt tolerance.

Likewise, polymers produced using gel polymerization exhibited poor salt tolerance as shown in the following table:

| IRS No | 1% viscosity in water (Tumbled for 2 hrs) (Sp3 @ 20 rpm, 20 degrees) | 1% viscosity in salt water (Sp3 @ 20 rpm, 20 degrees) |
| --- | --- | --- |
| 1x initiator | 4575 cP | 175 cP |
| 2x initiator | 2975 cP | 25 cP |
| 3x initiator | 2350 cP | 25 cP |
| 5x initiator | 1750 cP | 25 cP |

Terpolymers produced in accordance with other viable conventional polymerization techniques for making high-Mw thickening polymers would not be useful as rheology modifiers as described herein due to insufficient thickening efficiency. Terpolymers of ACM/AMPS/Stearyl Acrylate produced using solution polymerization process would not be commercially viable because the resulting polymer would be too difficult to process during the polymerization process at any commercially viable solids level (e.g. >5% solids).

What is claimed is:

1. A salt-tolerant, thermally-stable rheology modifier comprising a terpolymer of acrylamide, 2-acrylamido-2-methyl-propanesulfonic acid (AMPS) and a long-chain alkyl acrylate having a chain length for the alkyl group of from 12-25 wherein the long-chain alkyl acrylate is stearyl acrylate, wherein said terpolymer is made through a dispersion polymerization process and a saturated KCl or NaCl solution containing 1% by weight of the terpolymer has a Brookfield viscosity of about 400 cps or more at 20° C.

2. A salt-tolerant, thermally-stable rheology modifier in accordance with claim 1 wherein the modifier comprises from about 30-70 wt. % acrylamide, 70-30 wt. % AMPS, and 0.01-5 wt. % stearyl acrylate.

3. A salt-tolerant, thermally-stable rheology modifier in accordance with claim 1 wherein the molecular weight (Mw) of the modifier is over 1,000,000 daltons.

4. A salt-tolerant, thermally-stable rheology modifier in accordance with claim 1 wherein the molecular weight (Mw) of the modifier is from about 2,000,000 to 20,000,000 daltons.

5. A salt-tolerant, thermally-stable rheology modifier in accordance with claim 1 wherein the modifier is suitable for High Pressure/High Temperature (HP/HT) drilling operations at >300° F. temperature.

6. A salt-tolerant, thermally-stable rheology modifier in accordance with claim 1 wherein the modifier comprises from about 40-60 wt. % acrylamide, 60-40 wt. % AMPS, and 0.01-3 wt. % long-chain stearyl acrylate.

7. A salt-tolerant, thermally-stable rheology modifier in accordance with claim 1 wherein a mud formulation containing 1% of the rheology modifier maintains at least 40% of its measured values for plastic viscosity, yield point and gel strength after the mud formulation is subjected to aging up to 350° F. for 16 hours wherein the mud formulation has the composition set forth below:

| Chemical Name | CAS# | SG | g | Mixing Order |
| --- | --- | --- | --- | --- |
| Fresh water | 7732-18-5 | 1.000 | 260.00 |  |
| Soda Ash | 497-19-8 | 2.500 | 0.53 | 1 |
| NaCl | 7647-14-5 | 2.390 | 49.00 | 2 |
| Cellulosic Fluid Loss Additive | unknown | 1.600 | 2.00 | 4 |
| Modified Starch Fluid Loss Additive | unknown | 1.600 | 4.99 | 5 |
| BaSO$_4$ 1-4 µM | 7727-43-7 | 4.200 | 187.25 | 6 |
| Lubricant | unknown | 1.040 | 10.92 | 7 |
| Total |  |  | 514.69 |  | and the rheology modifier is added into the formulation after NaCl in an amount sufficient to provide a concentration of polymer in the mud formulation of 1% based on active rheology modifier in the total mud formulation and each of the components in the formulation is mixed to a fully hydrated state.

8. A wellbore fluid comprising an aqueous base fluid and the rheology modifier of claim 1.

9. A wellbore fluid in accordance with claim 8 wherein the aqueous base fluid is present in the wellbore fluid in an amount in the range of from about 30 to 99% by weight of the fluid.

10. A wellbore fluid in accordance with claim 8 wherein the rheology modifier is present in the wellbore fluid in an amount in the range of 0.5 to 50 g/l on an active basis.

11. A wellbore fluid in accordance with claim 8 wherein the wellbore fluid is a drilling fluid, a completion fluid, a workover fluid, a fracturing fluid, or an acidic treatment fluid.

12. A method of preparing a high molecular weight dispersion polymer having a bulk Brookfield viscosity of from about 100 to about 25,000 cps at 25° C. comprising:
  a) adding an initiator to an aqueous mixture comprising:
    i. from about 10 to about 40 weight percent of a mixture comprising 10-45 mole percent of Na AMPS, 55-90 mole percent of acrylamide and about 0.01-5 wt % based on the weight of Na AMPS and acrylamide of a long-chain alkyl acrylate having a chain length for the alkyl group of from 12-25; ii. from about 0.1 to about 10 weight percent based on the total weight of the dispersion polymer solids of a stabilizer, (based on polymer solids) wherein the stabilizer comprises polyacrylamidomethylpropane sulfonic acid and iii. from about 10 to about 40 weight percent based on the weight of the dispersion of a water soluble salt selected from the group consisting of ammonium, alkali metal and alkaline earth metal halides, sulfates, and phosphates; and
  b) polymerizing the monomers.

\* \* \* \* \*